(12) United States Patent
Ushiro

(10) Patent No.: US 11,932,151 B2
(45) Date of Patent: Mar. 19, 2024

(54) PARTITION OPENING/CLOSING SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shota Ushiro, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 443 days.

(21) Appl. No.: 17/421,866

(22) PCT Filed: Dec. 25, 2019

(86) PCT No.: PCT/JP2019/050731
§ 371 (c)(1),
(2) Date: Jul. 9, 2021

(87) PCT Pub. No.: WO2020/145137
PCT Pub. Date: Jul. 16, 2020

(65) Prior Publication Data
US 2022/0105847 A1    Apr. 7, 2022

(30) Foreign Application Priority Data

Jan. 11, 2019    (JP) .................................. 2019-003410

(51) Int. Cl.
*B60N 2/90*    (2018.01)
*B60N 3/00*    (2006.01)
*B60N 5/00*    (2006.01)

(52) U.S. Cl.
CPC ................. *B60N 2/91* (2018.02); *B60N 2/90* (2018.02); *B60N 3/00* (2013.01); *B60N 5/00* (2013.01)

(58) Field of Classification Search
CPC ... B60N 2/90; B60N 2/91; B60N 3/00; B60N 5/00; B60R 5/00
(Continued)

(56) References Cited

U.S. PATENT DOCUMENTS 5,848,817 A  * 12/1998 Niehaus ................ B60R 21/026
                                                    280/749
9,956,898 B1    5/2018 Dellock et al.
(Continued)

FOREIGN PATENT DOCUMENTS

JP    H4-119738 U    10/1992
WO    2018-225472 A1    12/2018

*Primary Examiner* — Jason S Daniels
(74) *Attorney, Agent, or Firm* — Honigman LLP

(57) ABSTRACT

Provision or non-provision of partitions is changeable in correspondence with the presence or absence of occupants in a vehicle. A partition opening/closing system is provided with a partition opening/closing determination unit and a partition drive unit. The partition drive unit is a drive device that drives opening and closing of partitions. Partitions are opened and closed between a plurality of seats provided in the vehicle. The partition opening/closing determination unit is a control unit that determines the necessity for opening/closing of partitions. Information indicating at least one of scheduled boarding and scheduled alighting of the vehicle by occupants is used in this determination.

5 Claims, 22 Drawing Sheets

(58) Field of Classification Search
USPC .......................................... 296/24.33, 24.46
See application file for complete search history.

(56) References Cited

U.S. PATENT DOCUMENTS

| | | | |
|---|---|---|---|
| 10,059,238 B1* | 8/2018 | Salter ..................... | G03B 21/56 |
| 10,479,506 B1* | 11/2019 | Colletti .............. | B64D 11/0606 |
| 10,752,196 B2* | 8/2020 | Lalague ................ | B60R 21/026 |
| 2012/0068490 A1* | 3/2012 | Vance ..................... | B60N 2/91 |
| | | | 296/24.46 |
| 2018/0099753 A1* | 4/2018 | Hall, Jr. ............. | B64D 11/0606 |
| 2019/0106021 A1 | 4/2019 | Dietrich et al. | |
| 2019/0202377 A1* | 7/2019 | Mizutani .............. | B62D 31/025 |

* cited by examiner

PARTITION OPENING/CLOSING SYSTEM

CROSS-REFERENCE TO RELATED APPLICATIONS

This application is the U.S. national stage of PCT/JP2019/050731 filed on Dec. 25, 2019, which claims priority of Japanese Patent Application No. JP 2019-003410 filed on Jan. 11, 2019, the contents of which are incorporated herein.

TECHNICAL FIELD

The present disclosure relates to a partition opening/closing system.

BACKGROUND

Technologies in which a partition for partitioning the cargo compartment and the driver's seat in a vehicle is opened and closed with an automatic door have been proposed. For example, the following JP 4-119738A proposes an automatic door that is openable and closable only when the vehicle is parked or stopped.

In the case where there are multiple occupants in a vehicle, there are also situations where it is not desirable for the occupants to be face to face with each other. In such cases, providing a partition between the seats where the occupants are sitting is advantageous from the viewpoint of reducing the possibility of face-to-face contact.

On the other hand, not providing a partition between unoccupied seats and occupied seats is advantageous from the viewpoint of increasing the occupation area of occupants who are seated and improving the comfort of sitting time.

However, all of the occupants will not necessarily board the vehicle at the same time, and will also not necessarily alight at the same time.

In view of this, an object of the present disclosure is to provide a technology with which provision or non-provision of a partition is changeable in correspondence with the presence or absence of occupants in a vehicle.

SUMMARY

A partition opening/closing system according to the present disclosure includes a drive device and a control device. The drive device drives opening/closing of a partition between a plurality of seats provided in a vehicle. The control device determines a necessity for the opening/closing, using information indicating at least one of scheduled boarding and scheduled alighting of the vehicle by occupants.

The present disclosure is not only realizable as a such a partition opening/closing system provided with a characteristic control device, and can be realized as a partition opening/closing method with relevant characteristic processing configured as steps, or can be realized as a program for causing a computer to execute these steps. Also, the present disclosure can be realized as a semiconductor integrated circuit that partially or wholly realizes the partition opening/closing system.

Advantageous Effects of Invention

According to the partition opening/closing system of the present disclosure, provision or non-provision of a partition is changeable in correspondence with the presence or absence of occupants in a vehicle.

DETAILED DESCRIPTION OF PREFERRED EMBODIMENTS

A partition opening/closing system of the present disclosure includes a drive device and a control device. The drive device drives opening/closing of a partition between a plurality of seats provided in a vehicle. The control device determines a necessity for the opening/closing, using information indicating at least one of scheduled boarding and scheduled alighting of the vehicle by occupants.

As a result of being provided with a control device, provision or non-provision of a partition is changeable in correspondence with the presence or absence of occupants.

Preferably, the control device decides the seat in which the occupants will sit, using the information. This is because partitioning that corresponds to the seating position of occupants of the vehicle is realized.

Preferably, if a second of the occupants is not scheduled to sit in a second of the seats adjacent to a first of the seats in which a first of the occupants sits, the partition between the first of the seats and the second of the seats is not closed. This is because the occupation area of occupants increases and the comfort of sitting time is improved.

Preferably, the opening/closing of the partition in correspondence with a situation in which the occupant who is scheduled to board the vehicle is seated ends before the occupant who is scheduled to board boards the vehicle. This is because the corresponding partition will already be in place when the occupant who is scheduled to board the vehicle actually boards, and the possibility of coming face to face with other occupants is reduced.

Specific examples of the partition opening/closing system according to the present disclosure will be described below with reference to the drawings. Note that the present disclosure is not limited to these illustrative examples and is defined by the claims, and all changes that come within the meaning and range of equivalency of the claims are intended to be embraced therein.

Illustrative Example of Partitioning in Vehicle

Figure 1:
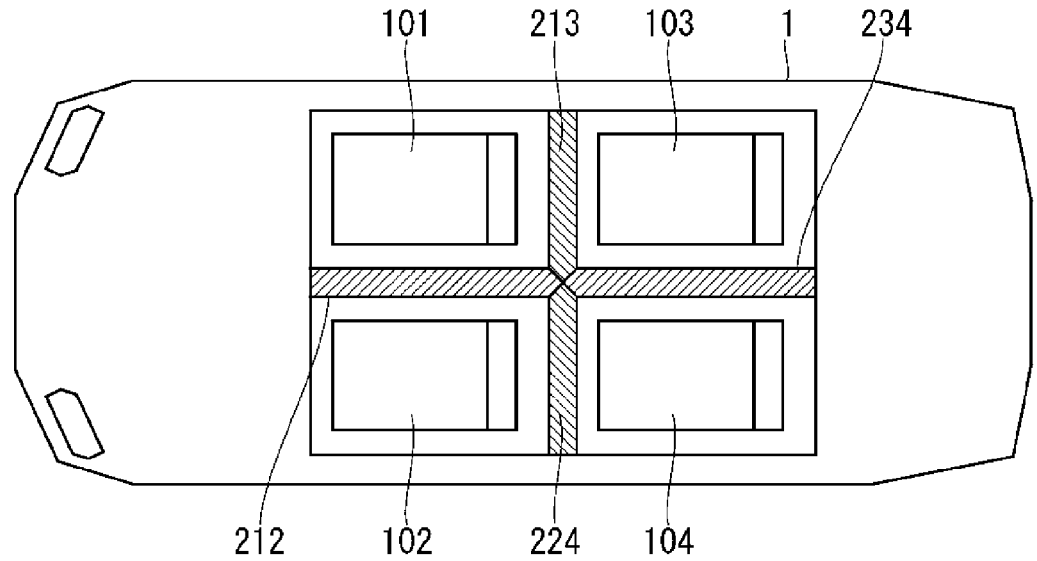
FIG. 1 is a diagram conceptually showing partitioning of a vehicle.
Figure 2:
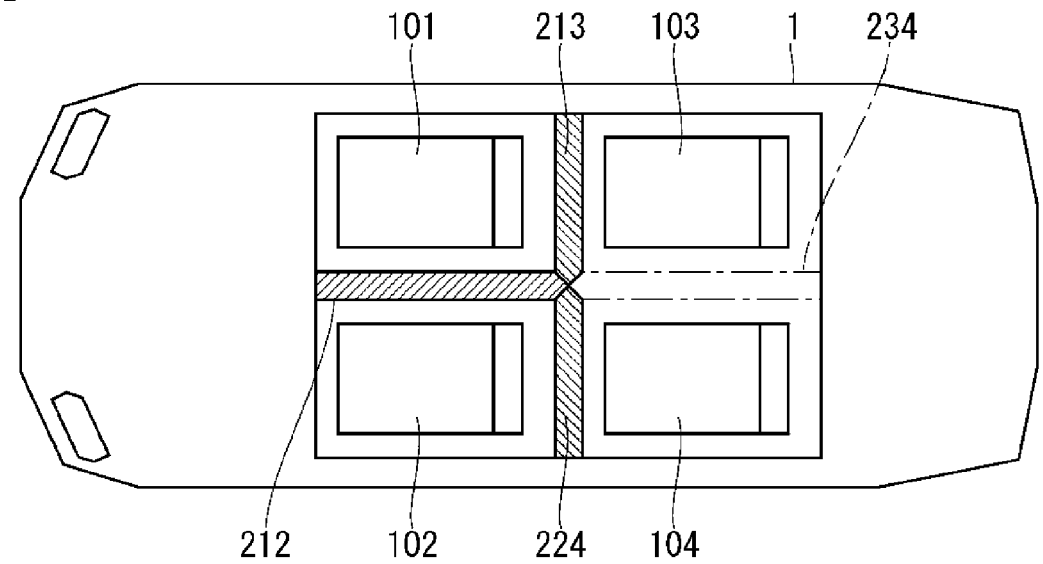
FIG. 2 is a diagram conceptually showing partitioning of a vehicle.

FIGS. 1 and 2 conceptually show partitioning of a vehicle. Seats 101, 102, 103 and 104 are provided inside a vehicle 1. In these diagrams, the left side of the diagram is the forward movement direction of the vehicle 1. The view in these diagrams is in a direction toward the floor from the roof of the vehicle 1. Illustration of the floor and roof themselves is omitted, in order to avoid complicating the illustration. This similarly applies to other diagrams in which all of the seats 101, 102, 103 and 104 are illustrated.

The seat 101 is provided on the right side in the forward movement direction, and the seat 102 is provided on the left side in the forward movement direction. The seat 103 is provided rearward of the seat 101, and can thus be said to be provided on the right side in the opposite direction to the forward movement direction. The seat 104 is provided rearward of the seat 102, and can thus be said to be provided on the left side in the opposite direction to the forward movement direction.

FIG. 1 illustrates the case where there is a partition 212 between the seats 101 and 102, a partition 213 between the seats 101 and 103, a partition 224 between the seats 102 and 104, and a partition 234 between the seats 103 and 104. The partitions 212, 213, 224 and 234 are shown with hatching.

FIG. 2 illustrates the case where the partition 212 is between the seats 101 and 102, the partition 213 is between the seats 101 and 103, and the partition 224 is between the seats 102 and 104. The partition 234 not being between the seats 103 and 104 is shown with an imaginary line.

In the description of the present embodiment, a partition being in place will be described as the partition being "closed", and a partition not being in place will be described as the partition being "open". The transition from the state in which a partition is not in place to the state in which a partition is in place will be described as "closing the partition" or "the partition being closed". The transition from the state in which a partition is in place to the state in which a partition is not in place will be described as "opening the partition" or "the partition being opened".

It is possible to open and close any of the partitions 212, 213, 224 and 234. This possibility will be described as "openable and closable".

Figure 3:
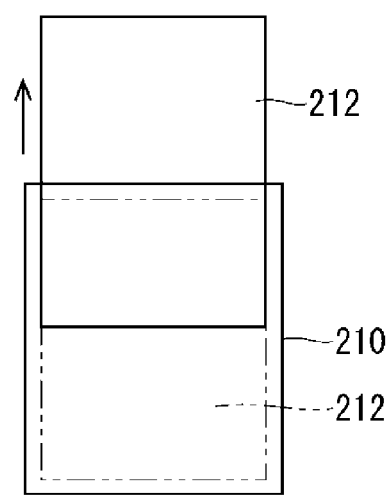
FIG. 3 is a diagram conceptually illustrating a configuration in which a partition is openable and closable.

FIG. 3 conceptually illustrates a configuration in which the partition 212 is openable and closable. FIG. 3 is a diagram seen from a direction parallel to a direction toward the seat 102 from the seat 101. In the case where the partition 212 is not in place between the seats 101 and 102, that is, the state in which the partition 212 is open, is shown with an imaginary line. The partition 212 in such a state is housed in a door pocket 210.

The door pocket 210 is provided between the seats 101 and 102 further downward (specifically, on the floor side) in the vehicle than the seat surfaces thereof. The door pocket 210 has a configuration in which the partition 212 goes in and out upward (opposite side to downward mentioned above) of the door pocket 210. For example, the door pocket 210 is open upward.

The partition 212 moves upward as illustrated by the arrow. As a result of this movement, the partition 212 is in place between the seats 101 and 102 (the partition 212 is closed). When the partition 212 opens, the partition 212 moves downward and is housed in the door pocket 210. Such a combination of the door pocket 210 and the partition 212 is realized by a known technology constituting power windows.

Figure 4:
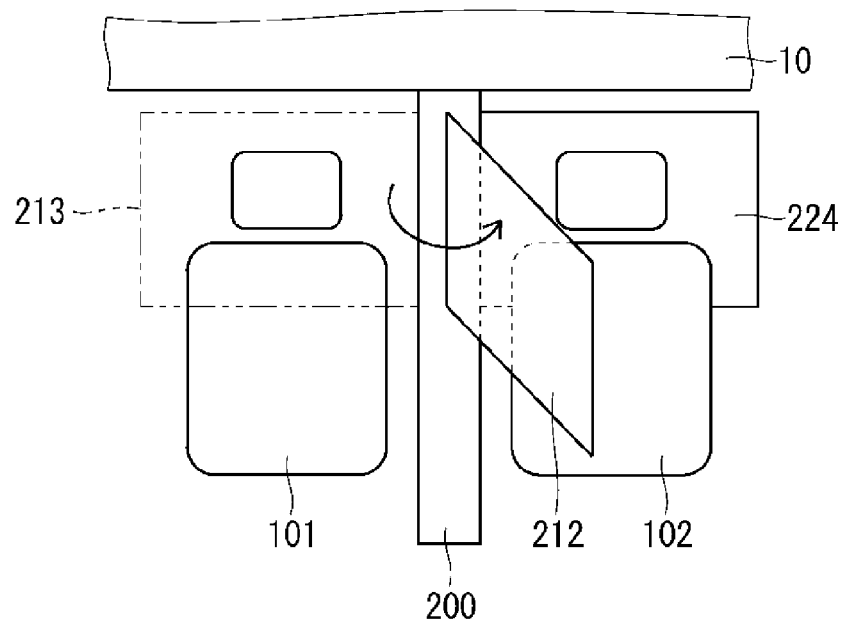
FIG. 4 is a diagram conceptually illustrating a configuration in which a partition is openable and closable.

FIG. 4 conceptually illustrates a configuration in which the partitions 212 and 213 are openable and closable. FIG. 4 is a diagram seen from a direction parallel to a direction toward the seat 103 from the seat 101. In FIG. 4, the seat backs of the seats 101 and 102 are illustrated. In the illustrative example of FIG. 4, one tabular member functions as one of the partitions 212 and 213. A state in which this member functions as the partition 213 is shown with an imaginary line, and the state in which the member functions as the partition 212 is shown with a solid line.

This member is attached to a shaft 200 and is able to rotate about the shaft 200. The shaft 200 extends in the up-down direction of the vehicle. As shown with the imaginary line, when the partition 213 is shut, the partition 212 is open (the state of the partition 212 at this time is not shown). As a result of this member rotating and moving in the direction shown by the arrow, the partition 213 opens and the partition 212 is closed.

Figure 5:
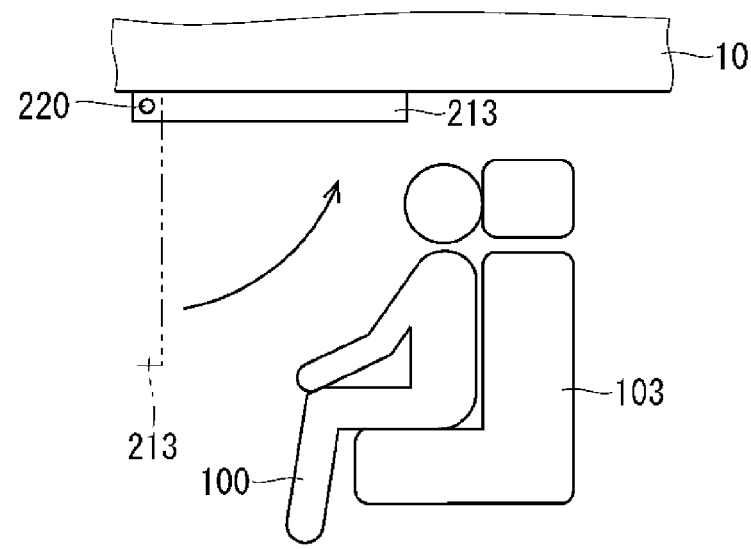
FIG. 5 is a diagram conceptually illustrating a configuration in which a partition is openable and closable.

FIG. 5 conceptually illustrates a configuration in which the partition 213 is openable and closable. FIG. 5 is a diagram seen from a direction parallel to a direction toward the seat 103 from the seat 104. A state in which the partition 213 is open is shown with a solid line, and a state in which the partition 213 is closed is shown with an imaginary line. The state in which an occupant 100 is sitting in the seat 103 is illustrated.

The partition 213 is attached to a shaft 220 and can be rotated about the shaft 220. The shaft 220 extends in a direction toward the seat 103 from the seat 104. Due to the partition 213 rotating and moving in the direction shown by the arrow, the partition 213 transitions from a closed state to an open state (partition 213 opens).

The opening and closing illustrated in FIGS. 3 to 5 may also be applied to those of partitions 212, 213, 224 and 234 that are not illustrated in FIGS. 3 to 5.

Illustrative Example of Opening/Closing of Doors

Figure 6:
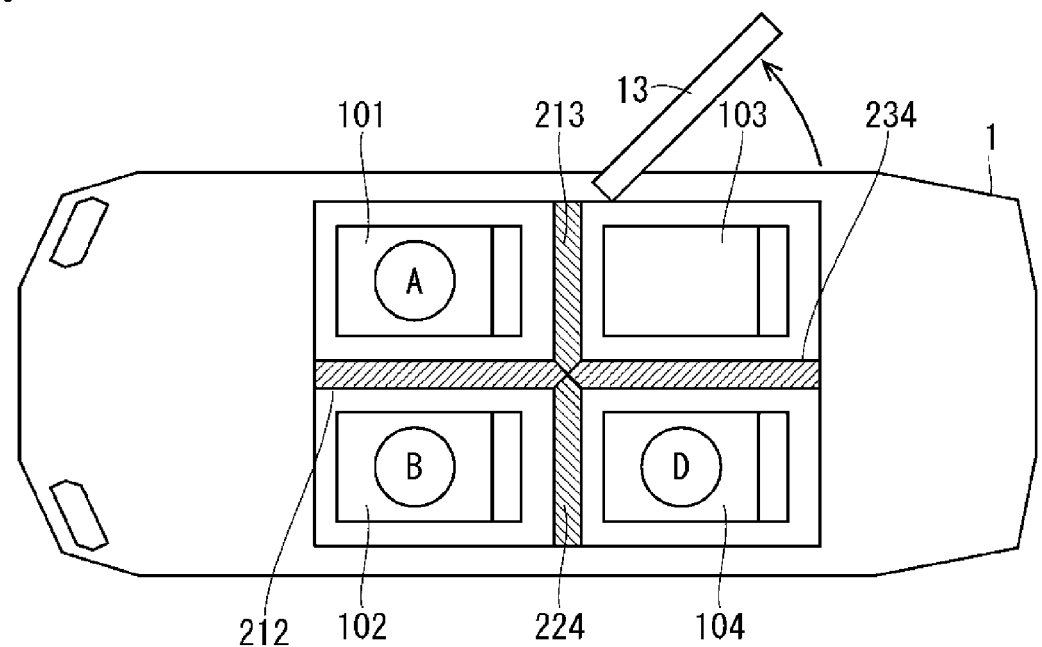
FIG. 6 is a diagram schematically showing opening and closing of doors when occupants board a vehicle.
Figure 7:
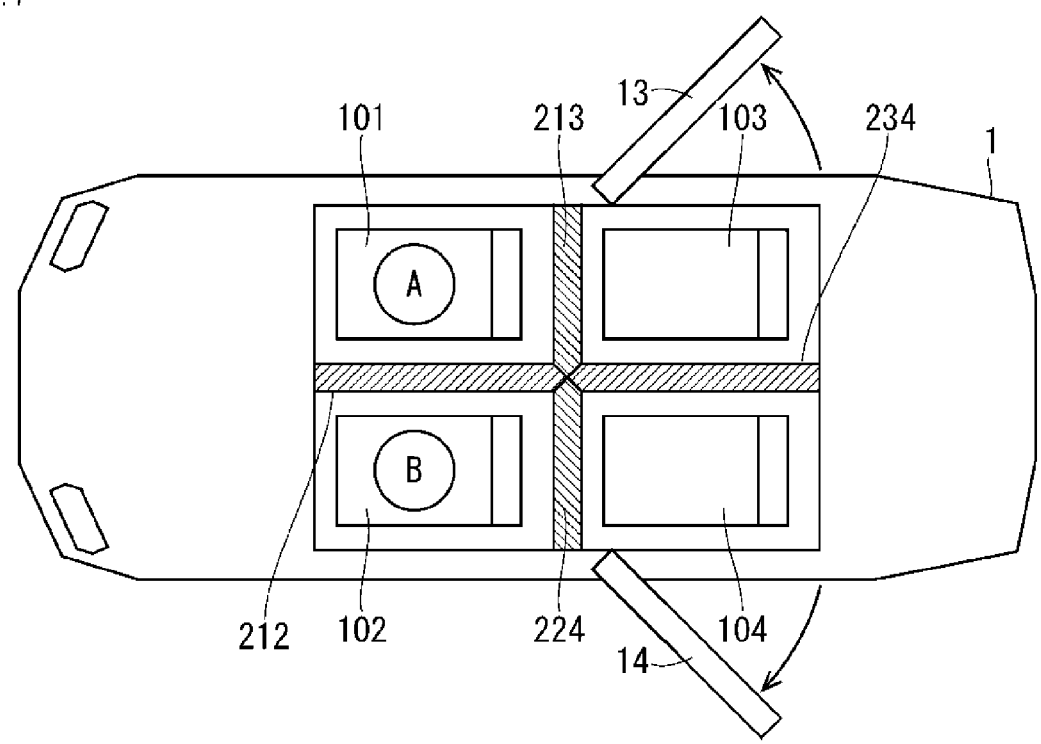
FIG. 7 is a diagram schematically showing opening and closing of doors when occupants board a vehicle.
Figure 8:
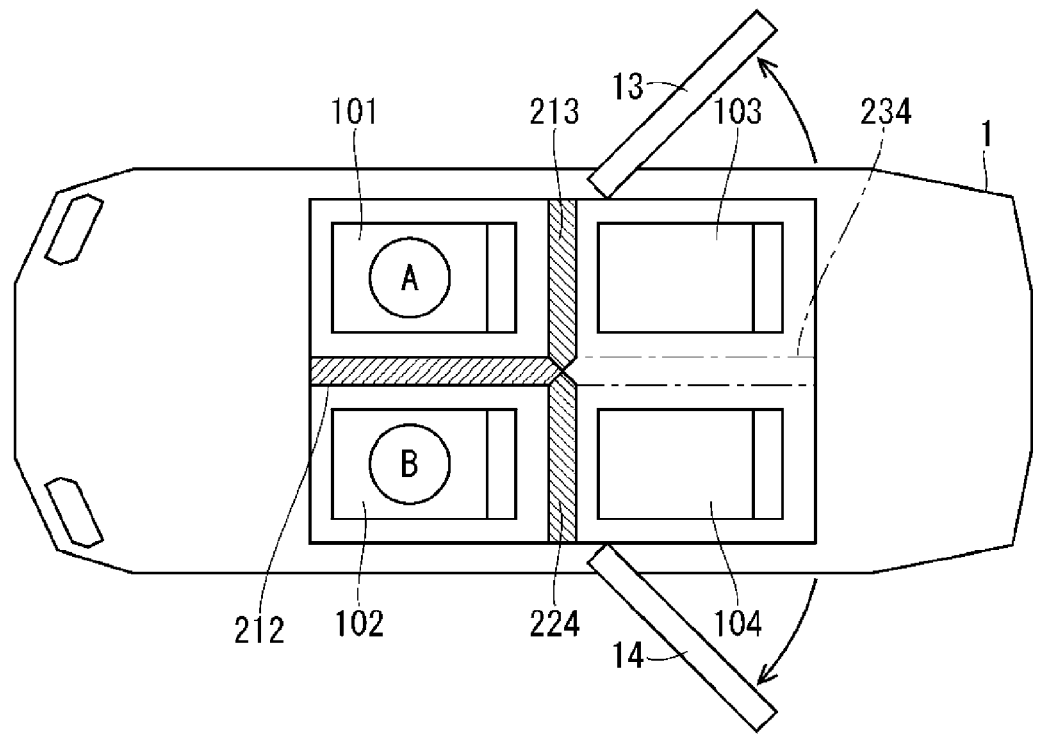
FIG. 8 is a diagram schematically showing opening and closing of doors when occupants board a vehicle.

FIGS. 6, 7 and 8 all schematically show opening and closing of doors when occupants board the vehicle 1. FIG. 6 shows the case where one occupant who is scheduled to sit in the seat 103 is received. An operation for opening a door 13 on the back right side nearest the seat 103 is shown by the arrow.

This occupant is carrying a communication terminal (e.g., smartphone), and the vehicle acquires information (hereinafter, provisionally referred to as "identification information") for identifying the communication terminal from the communication terminal, and measures the distance from the vehicle to the communication terminal. Because such acquisition of identification information and measurement of distance are known technologies, a detailed description thereof will be omitted. As for communication between the communication terminal and the vehicle, a Near-Field Communication (NFC) method compliant with the ISO/IEC 18092 standard may be employed, or a method (e.g., Bluetooth (registered trademark)) compliant with the IEEE 802.15 standard may be employed.

Information (hereinafter, provisionally referred to as "location information") indicating the location at which an occupant will board is known on the vehicle side prior to the occupant boarding, together with the identification information of the communication terminal carried by the occupant. The seat in which the occupant will sit is decided, based on the location information and the identification information. Deciding the seat will be described in detail later in the description of "group reservation".

When the vehicle and the communication terminal having the identification information that is known come in close proximity to each other, the door associated with the seat decided for the occupant who is carrying the communication terminal opens. FIG. 6 illustrates the case where the seat is the seat 103 and the door is the door 13.

FIGS. 7 and 8 show the case where two occupants who are respectively scheduled to sit in the seats 103 and 104 are received. Operations for opening the door 13 on the back right side nearest the seat 103 and a door 14 on the back left side nearest the seat 104 are shown by the arrows.

The case where the partition 234 is closed and the case where the partition 234 is open between the seats 103 and 104 are respectively illustrated in FIGS. 7 and 8. Whether to open or close the partition 234 is decided based on a setting tied to information that is obtained from the communication terminals being carried by the two occupants who are scheduled to be seated. This setting will be described in detail later in the Example Configuration of Partition Opening/Closing System section.

The doors 13 and 14 are also opened in the case where the occupants alight. After the distance between the communication terminals that are being carried by the occupants who alighted and the vehicle becomes greater than or equal to a threshold value, the doors 13 and 14 are closed. Processing before and after occupants alight will be described in detail later in the Processing Prior to Occupant Boarding and Processing after Occupant Alighting sections.

Ex-Post Opening and Closing of Partition

Figure 9:
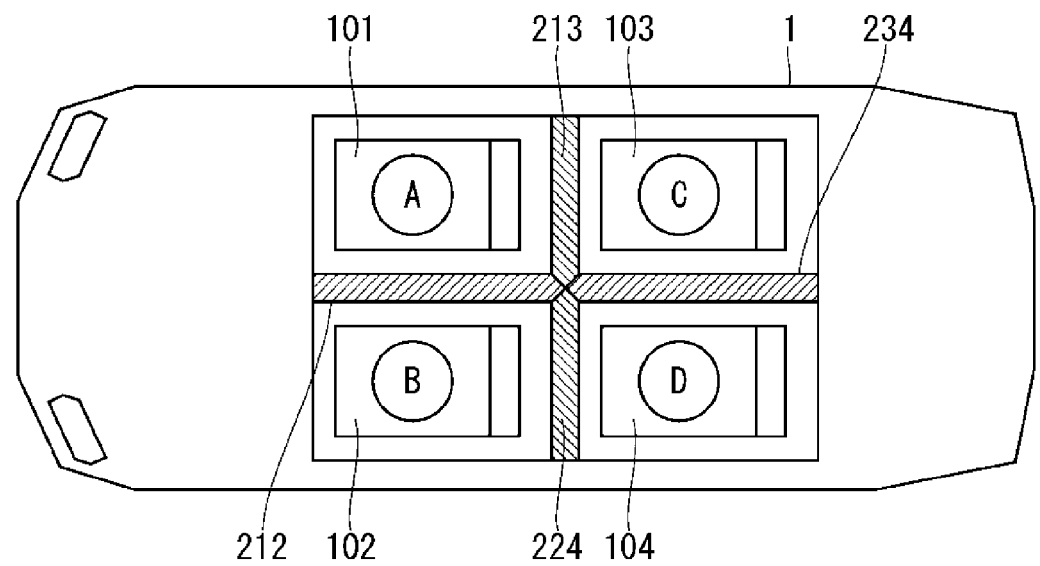
FIG. 9 is a diagram conceptually showing a state immediately after occupants have boarded a vehicle.

FIG. 9 conceptually shows a state immediately after occupants C and D board the vehicle 1. The single occupants A, B, C and D are respectively sitting in the seats 101, 102, 103 and 104. The partitions 212, 213, 224 and 234 are all closed.

Figure 10:
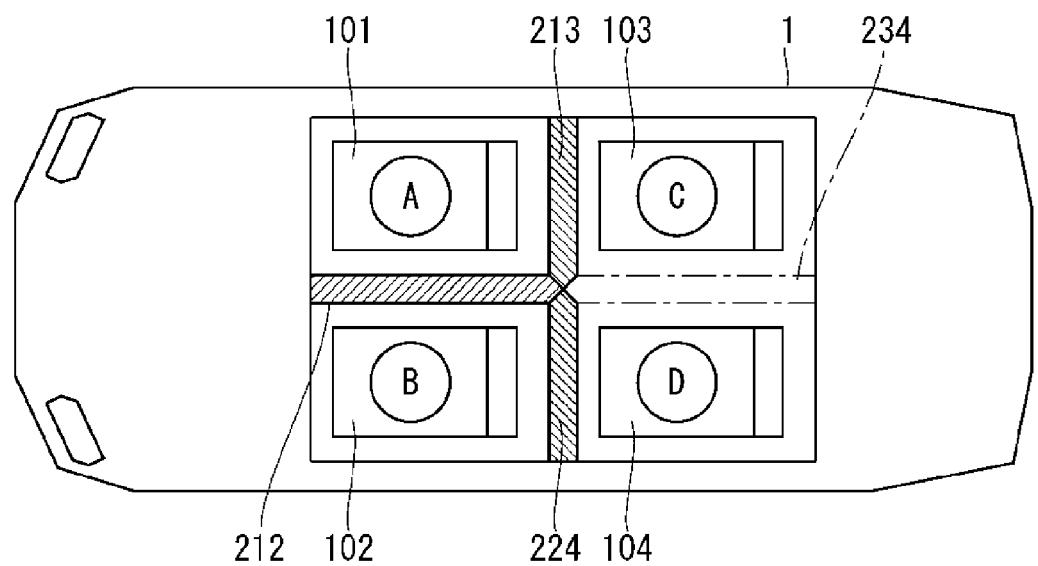
FIG. 10 is a diagram conceptually showing a state in which a partition opened due to a request by an occupant.

FIG. 10 conceptually shows a state in which the partition 234 is open from the state of FIG. 9, due to a request by the occupant C. Because the partition 234 is in place between the seats 103 and 104, the consent of the occupant D with regard to opening the partition 234 is confirmed.

Figure 11:
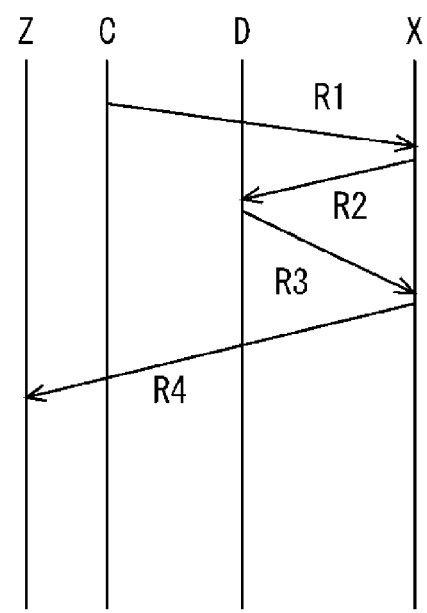
FIG. 11 is a diagram illustrating transmission of information from a request by an occupant until opening of a partition.

FIG. 11 illustrates transmission of information from the request of the occupant C until when the partition 234 is opened. The symbols C and D respectively indicate the communication terminals of the occupants C and D. A communication device Z that is installed in the vehicle 1 and a communication facility X that is provided outside the vehicle 1 are also shown. The passage of time is indicated by the downward direction in the diagram.

A request R1 is transmitted from the occupant C to the communication facility X. The request R1 conveys a request to open the partition 234 that is closed. The communication facility X transmits a notification R2 to the occupant D, triggered by having received the request R1. The notification R2 conveys that opening of the partition 234 was requested by the occupant C, and requests a response regarding the permissibility of opening the partition 234. The occupant D transmits a response R3 to the communication facility X in response to the notification R2. The response R3 indicates the permissibility of opening the closed partition 234. The communication facility X transmits a signal R4 to the communication device Z, triggered by having received the response R3. The signal R4 includes an instruction about whether to maintain the state in which the partition 234 is closed or to open the partition 234. In accordance with the instruction of the signal R4, the partition 234 is maintained in the closed state or the partition 234 is opened.

Opposite to the case illustrated in FIGS. 10 and 11, the partition 234 that is already open in the state in which the occupants C and D are respectively sitting in the seats 103 and 104 can be closed by a request from the occupant C. In this case, the request R1 is a request to close the open partition 234, and the notification R2 conveys that closing of the partition 234 has been requested by the occupant C, and requests a response regarding the permissibility of closing the partition 234. The response R3 indicates the permissibility of closing the open partition 234. The signal R4 includes an instruction about whether to maintain the state in which the partition 234 is open or to close the partition 234. The specific flow of processing regarding opening and closing of partitions will be described in detail next.

Example Configuration of Partition Opening/Closing System

Figure 12:
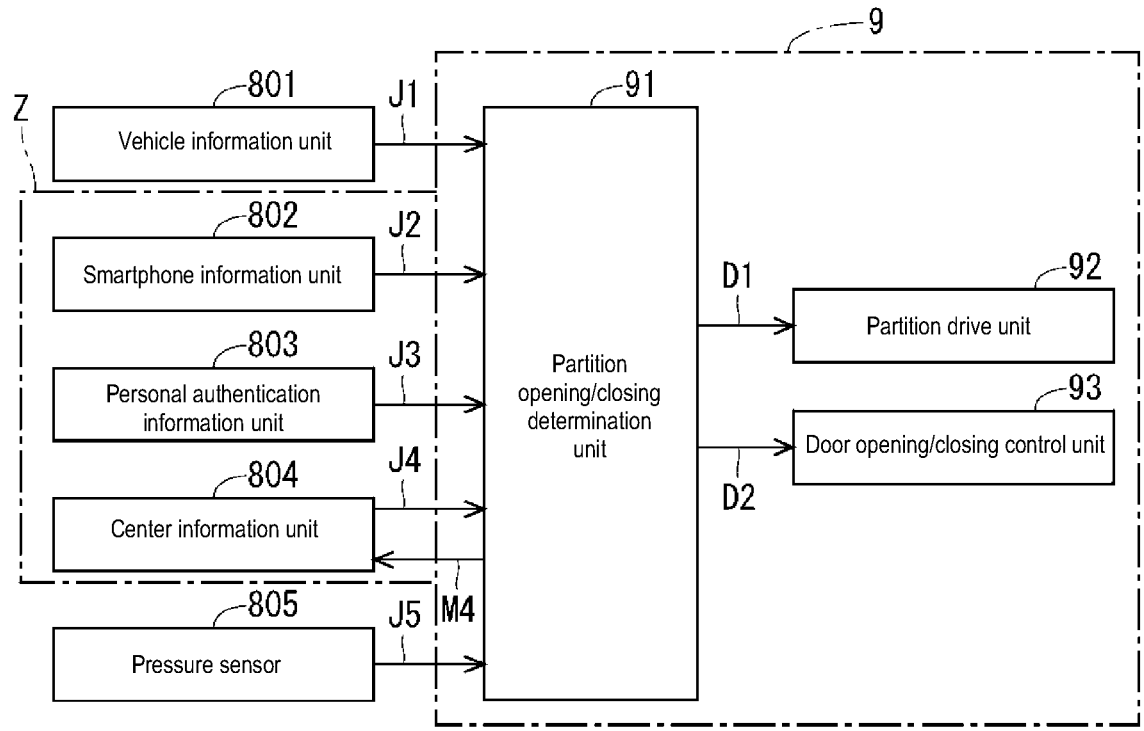
FIG. 12 is a diagram illustrating the configuration of a partition opening/closing system.

FIG. 12 illustrates the configuration of a partition opening/closing system 9 that is used in opening and closing of the partitions 212, 213, 224 and 234. The partition opening/closing system 9 is provided with a partition opening/closing determination unit 91, a partition drive unit 92, and a door opening/closing control unit 93, and is installed in the vehicle 1.

The partition drive unit 92 is a drive device that drives opening and closing of the partitions 212, 213, 224 and 234, and is specifically realized by an actuator exemplified by a motor. In terms of the illustrative example in FIG. 3, housing of the partition 212 in the door pocket 210 and sending of the partition 212 out from the door pocket 210 is performed by the partition drive unit 92. In terms of the illustrative example in FIG. 4, rotation of the member serving as both the partitions 212 and 213 about the shaft 200 is performed by the partition drive unit 92. In terms of the illustrative example in FIG. 5, movement of the partition 213 about the shaft 220 is performed by the partition drive unit 92.

The door opening/closing control unit 93 controls opening and closing of the doors of the vehicle 1. In terms of the illustrative examples of FIGS. 6, 7 and 8, the door opening/closing control unit 93 controls opening and closing of the doors 13 and 14. Because such functions and the technology needed to realize these functions are known, a detailed description thereof will be omitted.

The partition opening/closing determination unit 91 is realized by an Electronic Control Unit (hereinafter, also referred to as an "ECU") that is exemplified by a Body Control Module (hereinafter, also referred to as a "BCM"). The partition opening/closing determination unit 91 is a control device that determines the necessity for opening/closing the partitions 212, 213, 224 and 234 using various information, causes the partition drive unit 92 to perform the opening/closing, and causes the door opening/closing control unit 93 to open/close the doors.

FIG. 12 illustrates the case where vehicle information J1, smartphone information J2, personal authentication information J3 for personal authentication, information J4 from a data center and pressure sensor information J5 are input to the partition opening/closing determination unit 91.

The vehicle information J1 includes a distinction as to whether the vehicle 1 is traveling or stopped, for example, and information (hereinafter, provisionally referred to as "own position information") indicating the position of the vehicle 1. The vehicle information J1 can be acquired from a vehicle information unit 801. The vehicle information unit 801 is a functional block collectively showing a known device for acquiring own position information and a known device for acquiring the traveling speed of the vehicle 1.

The smartphone information J2 includes the above-described identification information. The personal authentication information J3 is used in the judgment of whether the proper occupant is carrying the communication terminal that is identified by the smartphone information J2. The information J4 from the data center includes reservation data described later, apart from the above-described signal R4. A known communication device is employed for all of a smartphone information unit 802 that acquires the smartphone information J2, a personal authentication information unit 803 that acquires the personal authentication information J3, and a center information unit 804 that acquires the information J4. The case where this communication device is included in the communication device Z (see FIG. 11) is illustrated in FIG. 12.

The pressure sensor information J5 indicates the pressure that is applied to the seat surfaces of the seats 101, 102, 103 and 104, and the pressure that is applied to the partitions 212, 213, 224 and 234 in the opening/closing operation. Whether an occupant is seated is determined by the pressure that is applied to the seat surface. For example, when the pressure that is applied to the partition 212 exceeds a predetermined threshold value, it is determined that an event has occurred that is impeding the opening/closing operation of the partition 212, such as there being an impediment, for example. The pressure sensor information J5 is acquired from a known pressure sensor 805.

Illustrative Example of Opening and Closing of Partitions

FIGS. 13 to 22 chronologically show states in which the occupants A, B, C and D board or alight the vehicle 1. Here, the case is shown where the occupant A is scheduled to board the vehicle 1 first when nobody is on board, following by the occupants B, C and D in the stated order, and then the occupant B alights, followed by the occupant C, and thereafter the occupants A and D both alight together. In these diagrams, open partitions (that are not in place between the seats) are illustrated with imaginary lines.

Figure 13:
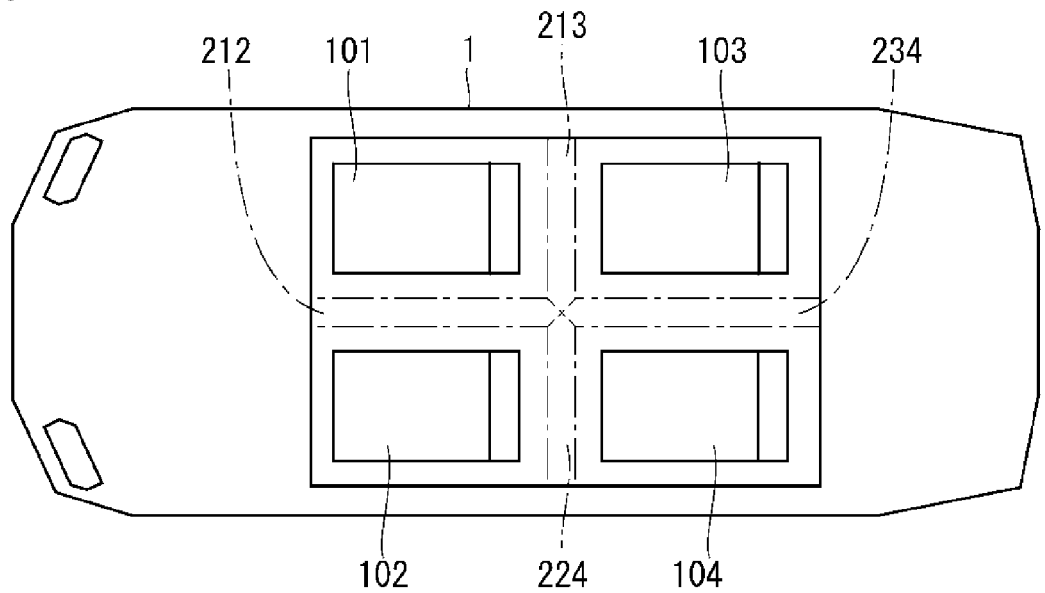
FIG. 13 is a diagram showing a state in which occupants board or alight a vehicle.
Figure 14:
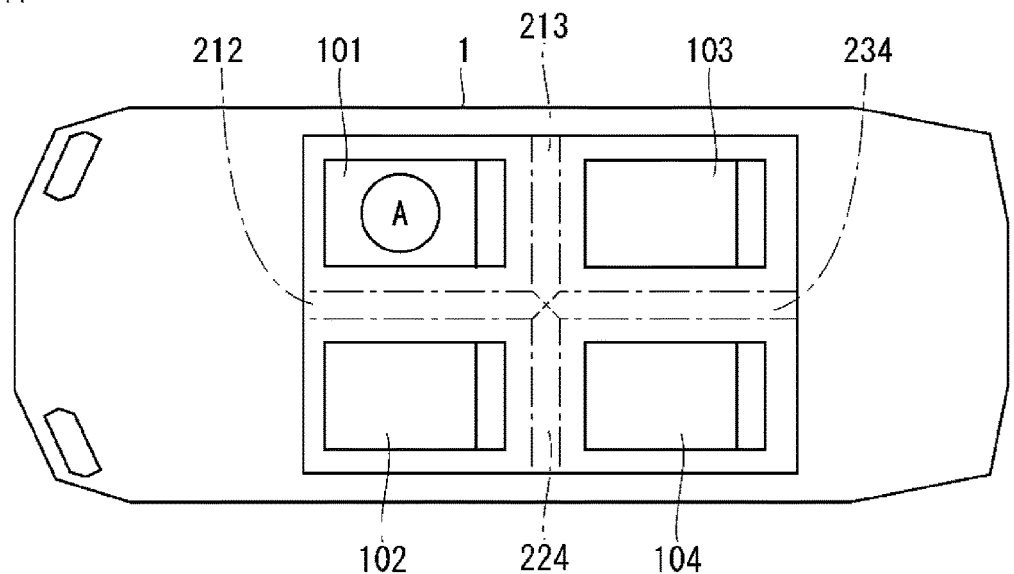
FIG. 14 is a diagram showing a state in which occupants board or alight a vehicle.

FIG. 13 shows the state of the vehicle 1 before the occupant A boards. The occupant A is scheduled to sit in the seat 101. FIG. 14 shows the state of the vehicle 1 immediately after the occupant A sits in the seat 101. None of the partitions 212, 213, 224 and 234 are in place between the seats.

Figure 15:
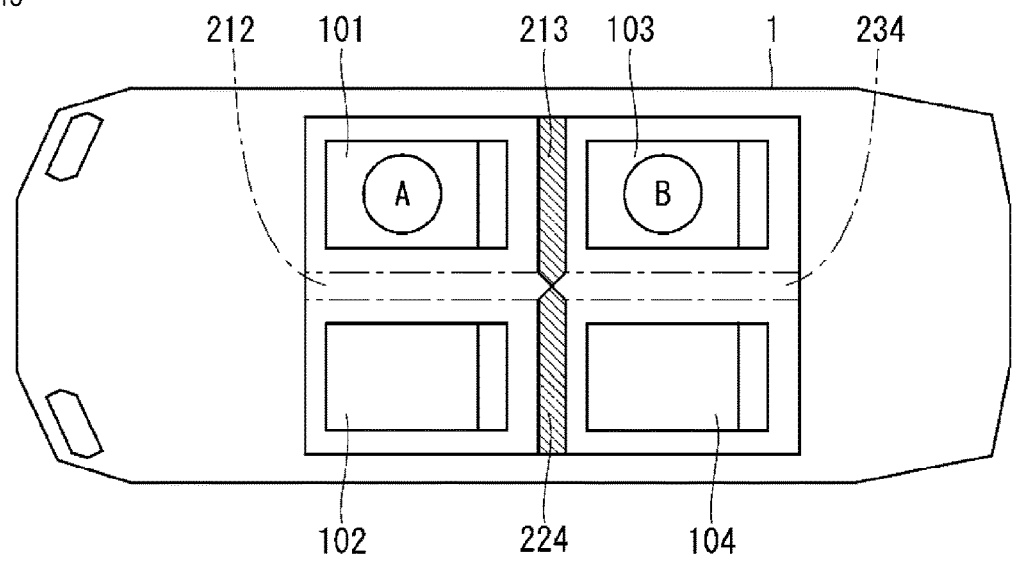
FIG. 15 is a diagram showing a state in which occupants board or alight a vehicle.

After the occupant A sits in the seat 101, the occupant B is scheduled to board and sit in the seat 103. The partitions 213 and 224 are closed before the occupant B boards. FIG. 15 shows the state of the vehicle 1 immediately after the occupant B boards and sits in the seat 103. Because the partitions 213 and 224 are closed, the possibility of the occupants A and B coming face to face is low. On the other hand, because the partitions 212 and 234 are open, the occupation area of the occupant A is larger than the seat 101 by the amount of the seat 102, and the occupation area of the occupant B is larger than the seat 103 by the amount of the seat 104.

Figure 16:
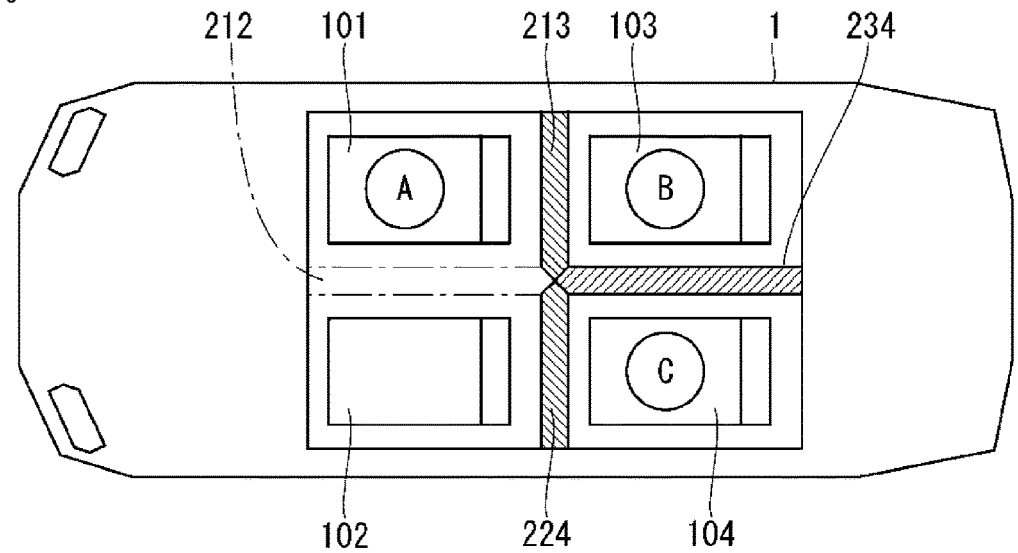
FIG. 16 is a diagram showing a state in which occupants board or alight a vehicle.

After the occupant B boards and sits in the seat 103, the occupant C is scheduled to board and sit in the seat 104. The partition 234 is closed before the occupant C boards. FIG. 16 shows the state of the vehicle 1 immediately after the occupant C boards and sits in the seat 104. Because the partitions 213, 224 and 234 are closed, the possibility of the occupants A, B and C coming face to face with each other is low. On the other hand, because the partition 212 is open, the occupation area of the occupant A is larger than the seat 101 by the amount of the seat 102.

Figure 17:
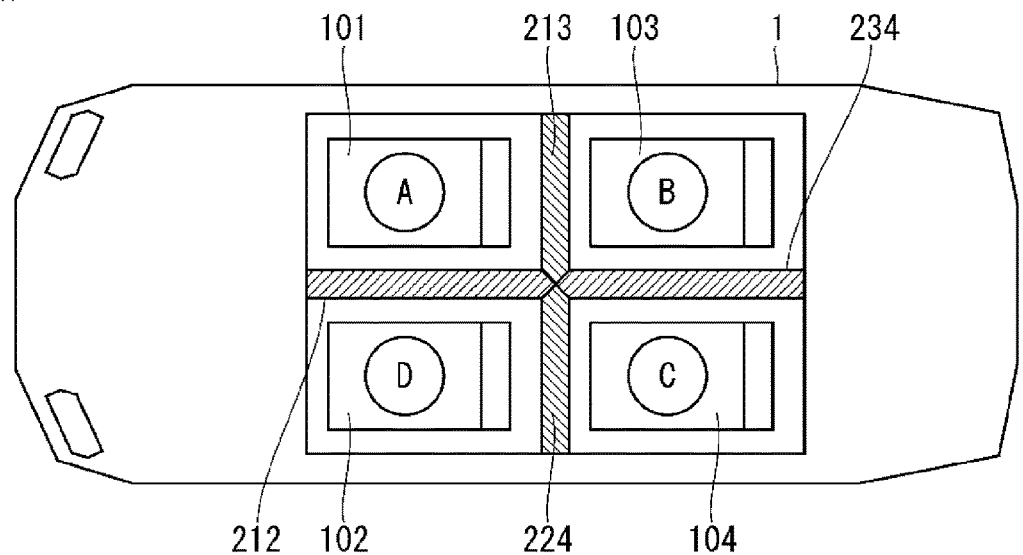
FIG. 17 is a diagram showing a state in which occupants board or alight a vehicle.

After the occupant C boards and sits in the seat 104, the occupant D is scheduled to board and sit in the seat 102. The partition 212 is closed before the occupant D boards. FIG. 17 shows the state of the vehicle 1 immediately after the occupant D boards and sits in the seat 102. Because the partitions 212, 213, 224 and 234 are closed, the possibility of the occupants A, B, C and D coming face to face with each other is low.

In the state illustrated in FIG. 17, the partition 234 could, however, also be opened due to a request from the occupant B. Such description of the opening and closing of partitions after occupants have boarded is to be understood as description in which the occupants B and C respectively replace the occupants C and D in the description that refers to FIGS. 10 and 11.

Figure 18:
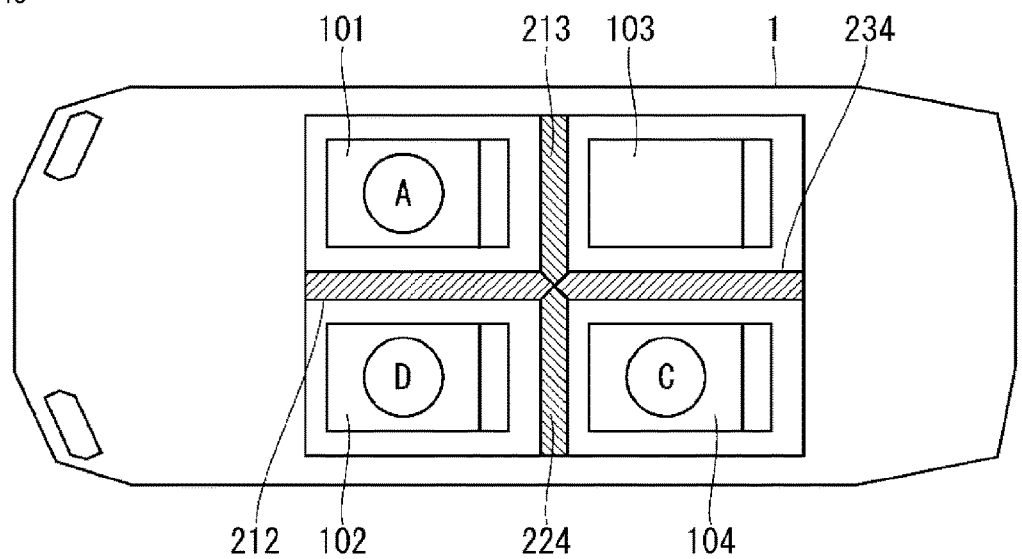
FIG. 18 is a diagram showing a state in which occupants board or alight a vehicle.
Figure 19:
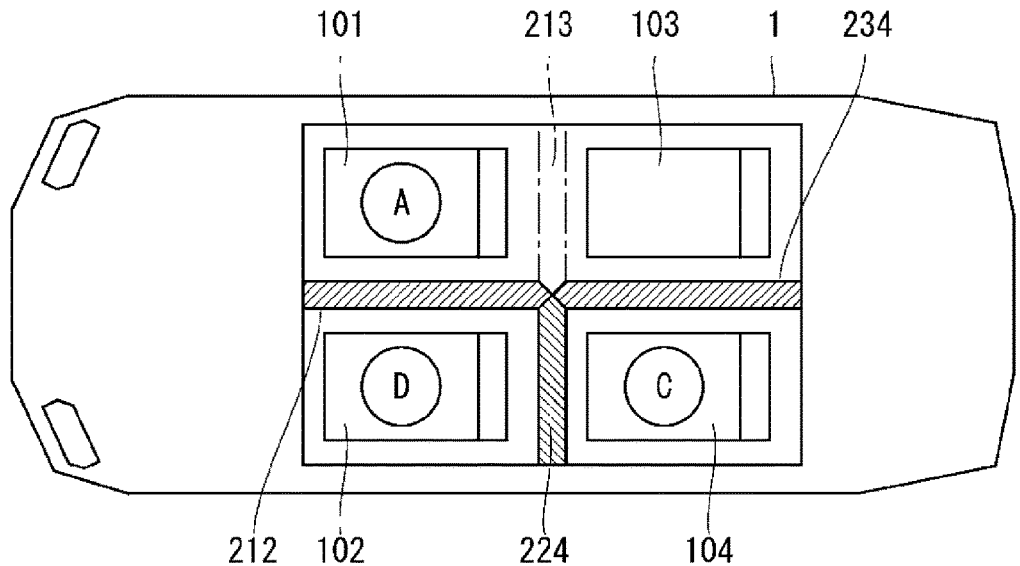
FIG. 19 is a diagram showing a state in which occupants board or alight a vehicle.

FIG. 18 shows the state of the vehicle 1 immediately after the occupant B alights. FIG. 19 shows the state of the vehicle 1 immediately before the occupant C alights, after the occupant B has alighted. In the period before the occupant C alights after the occupant B has alighted, no occupants are scheduled to newly board or alight. Therefore, the partition 213 is opened from the state of FIG. 18, and the occupation area of the occupant A increases as shown in FIG. 19.

Figure 20:
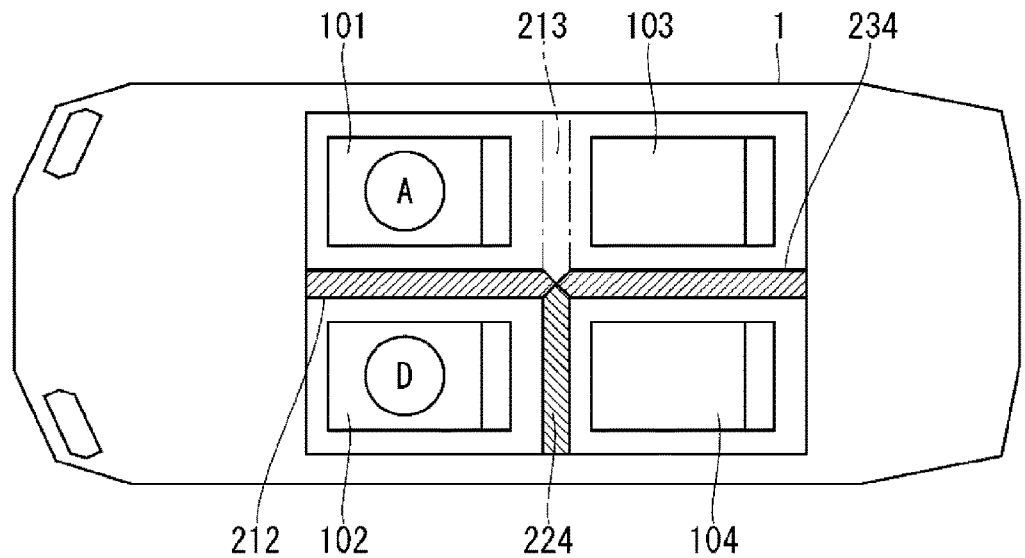
FIG. 20 is a diagram showing a state in which occupants board or alight a vehicle.
Figure 21:
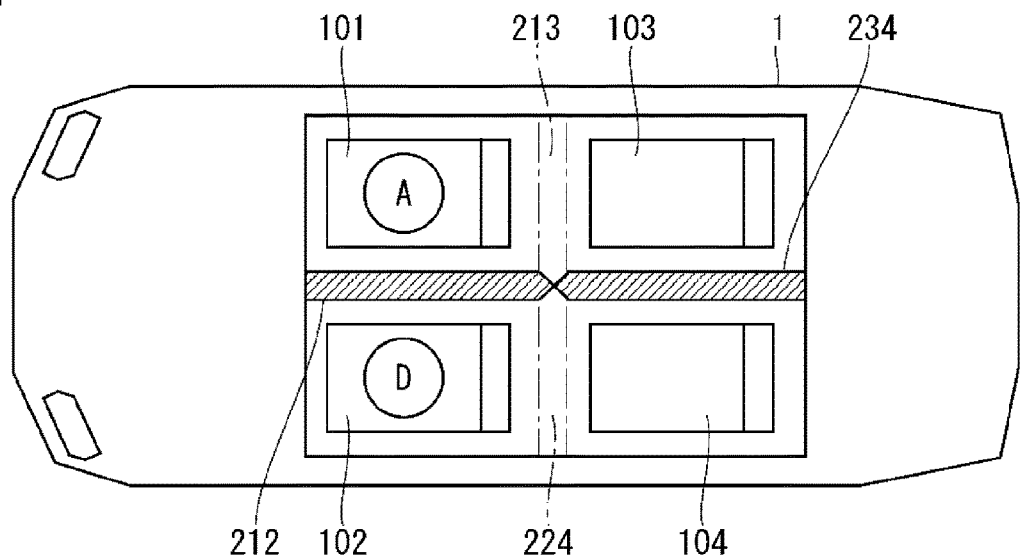
FIG. 21 is a diagram showing a state in which occupants board or alight a vehicle.

FIG. 20 shows the state of the vehicle 1 immediately after the occupant C alights. FIG. 21 shows the state of the vehicle 1 immediately before the occupants A and D alight, after the occupant C has alighted. In the period before the occupants A and B alight after the occupant C has alighted, no occupants are scheduled to newly board or alight. Therefore, the partition 224 is opened from the state of FIG. 20, and the occupation area of the occupant D increases as shown in FIG. 21.

Figure 22:
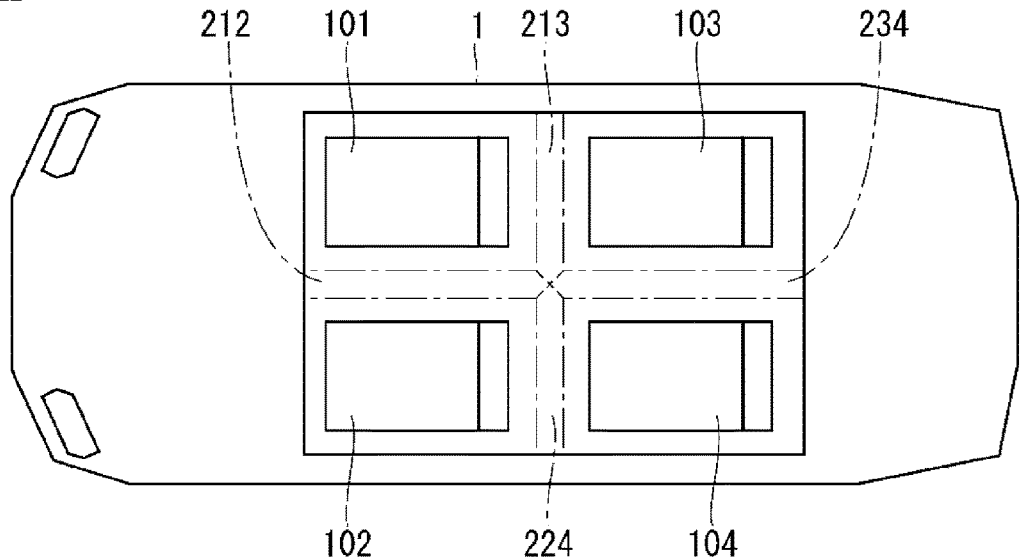
FIG. 22 is a diagram showing a state in which occupants board or alight a vehicle.
Figure 23:
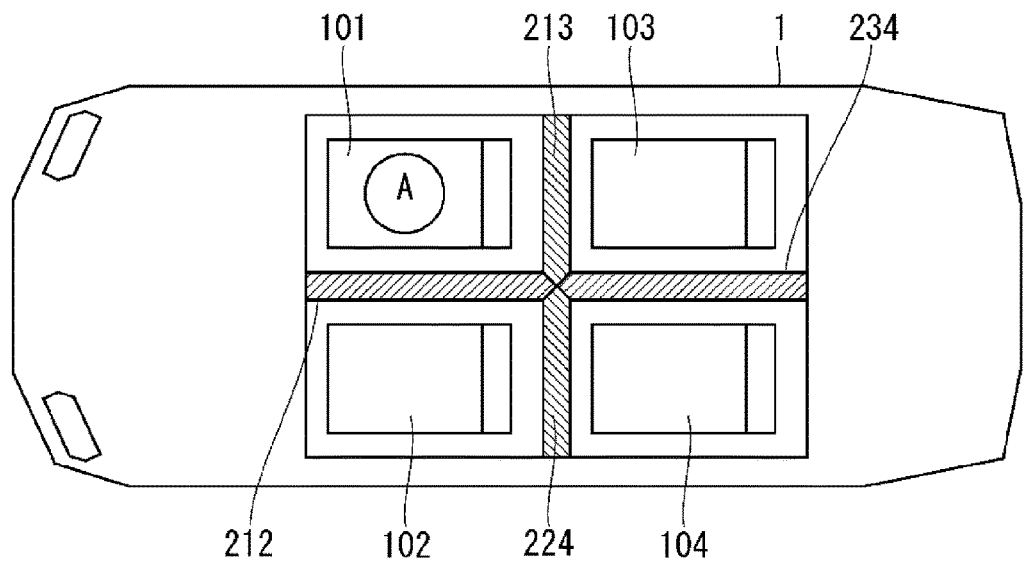
FIG. 23 is a diagram illustrating layout decision processing.

FIG. 22 shows the state of the vehicle 1 after the occupants A and D have alighted. Subsequently, no occupants are scheduled to newly board or alight. Therefore, the partitions 212 and 234 are both opened, and the vehicle 1 returns to the state shown in FIG. 13.

Partitioning that corresponds to the occupants of the vehicle 1 is realized, by the partition opening/closing determination unit 91 thus determining the necessity for opening and closing partitions using the information J4 (specifically, reservation data), and causing the partition drive unit 92 to open and close the partitions 212, 213, 224 and 234. This brings about the effect of provision or non-provision of partitions being changeable in correspondence with the presence or absence of occupants in the vehicle 1.

Illustrative Example of Processing for Deciding Partitions to be Opened/Closed

The occupation area that is allocated to the occupants is decided as a result of the partitions to be opened and closed being decided. Therefore, processing in which the partitions to be opened and closed are decided will hereinafter also be referred to as layout decision processing.

FIGS. 23 to 26 illustrate layout decision processing that is performed when the vehicle 1 transitions from the state shown in FIG. 13 to the state shown in FIG. 14. The diagrams shown in FIGS. 23, 24, 25 and 26 show the progression of this processing in the stated order.

Figure 27:
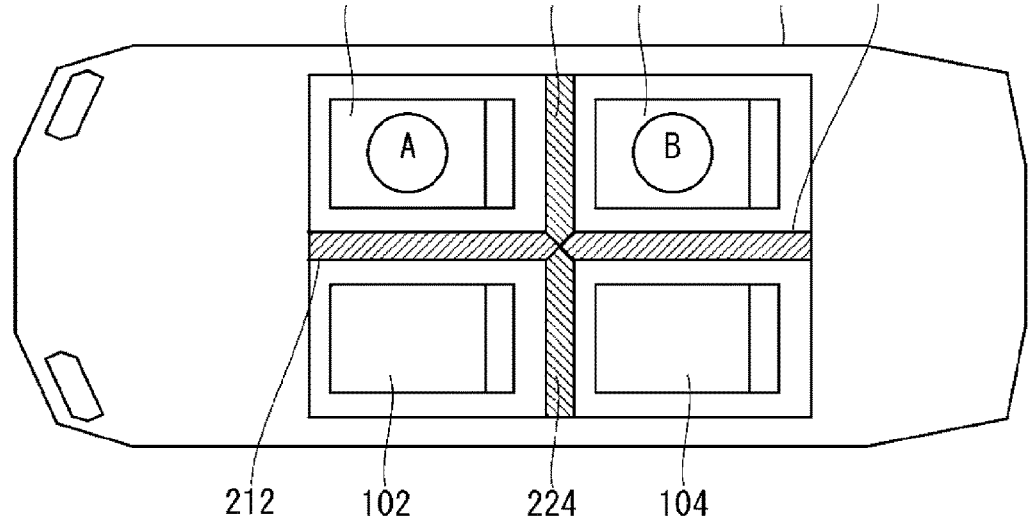
FIG. 27 is a diagram illustrating layout decision processing.
Figure 28:
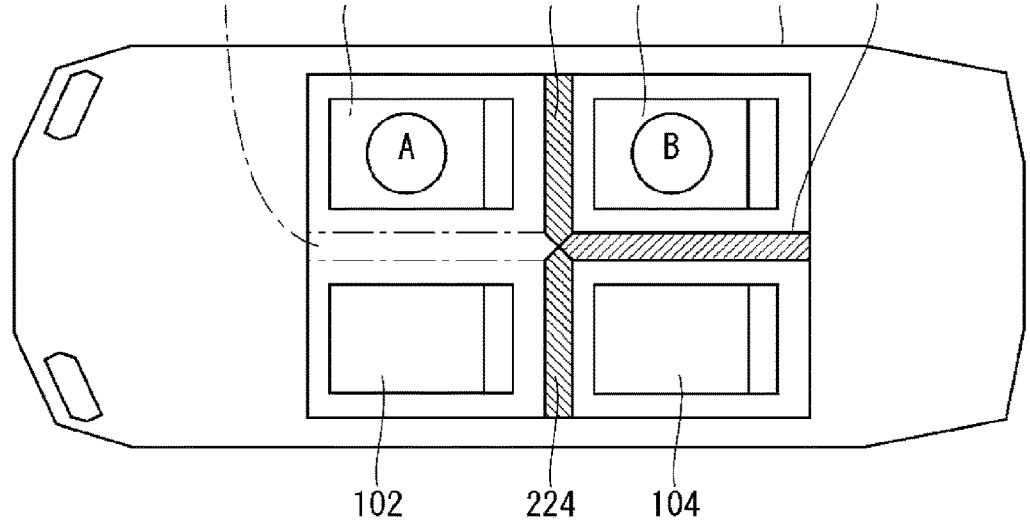
FIG. 28 is a diagram illustrating layout decision processing.
Figure 29:
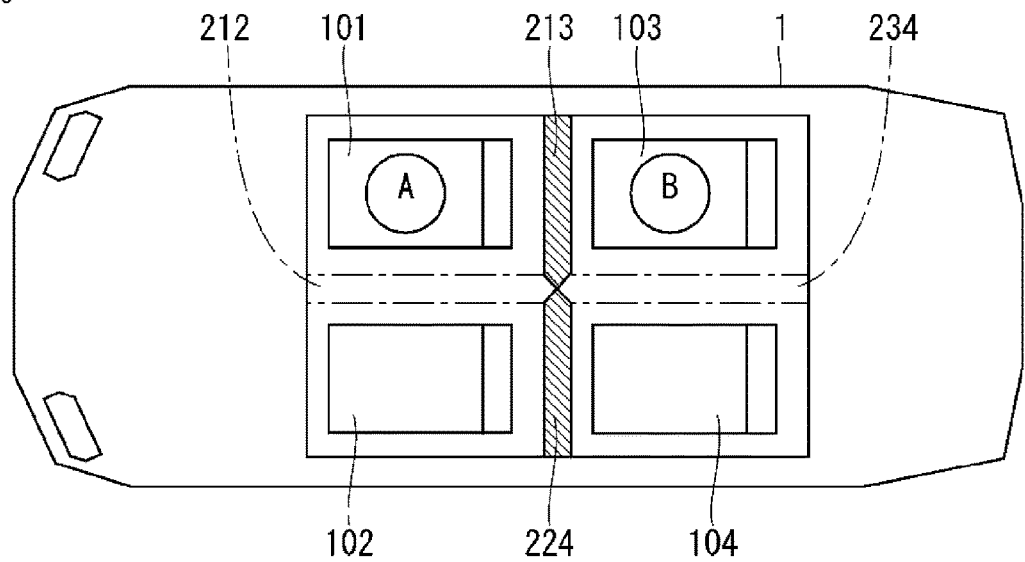
FIG. 29 is a diagram illustrating layout decision processing.

FIGS. 27 to 29 illustrate layout decision processing that is performed when the vehicle 1 transitions from the state shown in FIG. 14 to the state shown in FIG. 15. The diagrams shown in FIGS. 27, 28 and 29 show the progression of this processing in the stated order.

Figure 30:
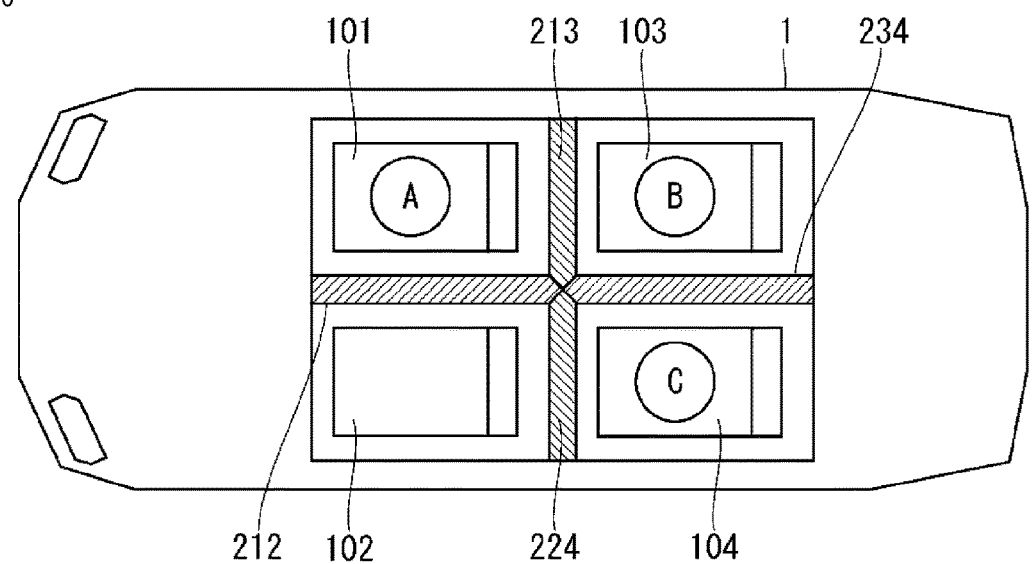
FIG. 30 is a diagram illustrating layout decision processing.
Figure 31:
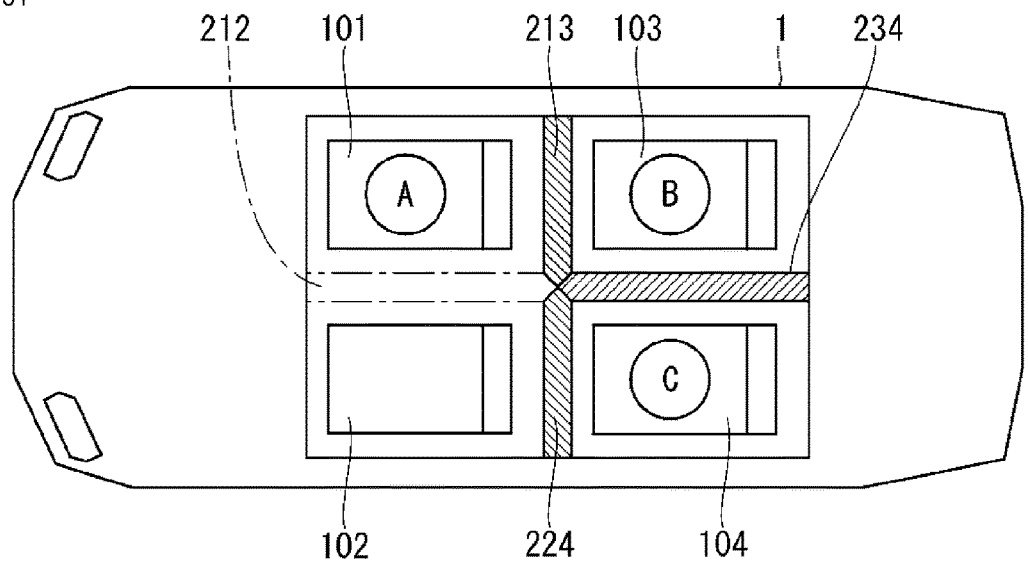
FIG. 31 is a diagram illustrating layout decision processing.

FIGS. 30 and 31 illustrate layout decision processing that is performed when the vehicle 1 transitions from the state shown in FIG. 15 to the state shown in FIG. 16. The diagrams shown in FIGS. 30 and 31 show the progression of this processing in the stated order.

Figure 32:
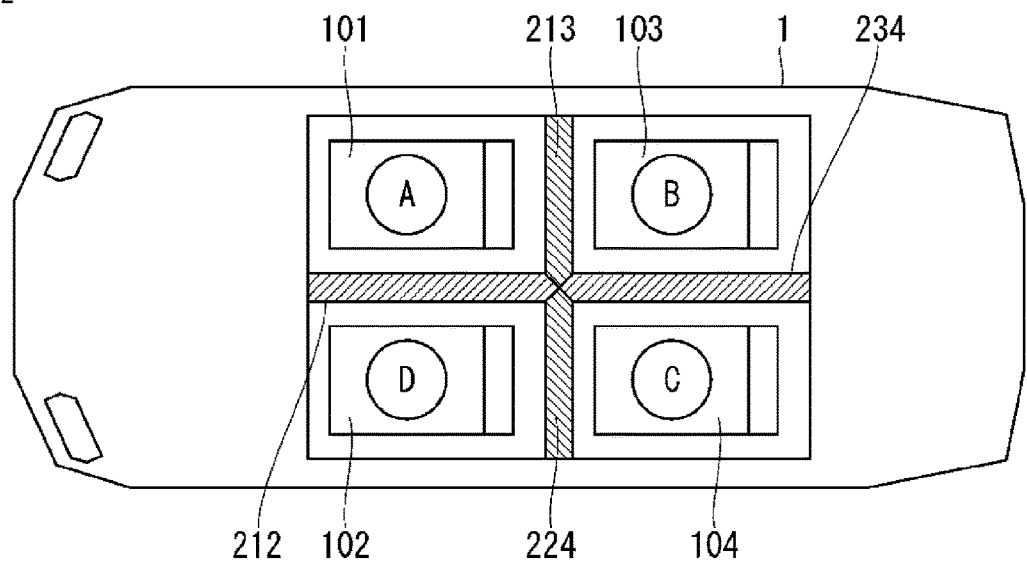
FIG. 32 is a diagram illustrating layout decision processing.

FIG. 32 illustrates layout decision processing that is performed when the vehicle 1 transitions from the state shown in FIG. 16 to the state shown in FIG. 17.

Figure 33:
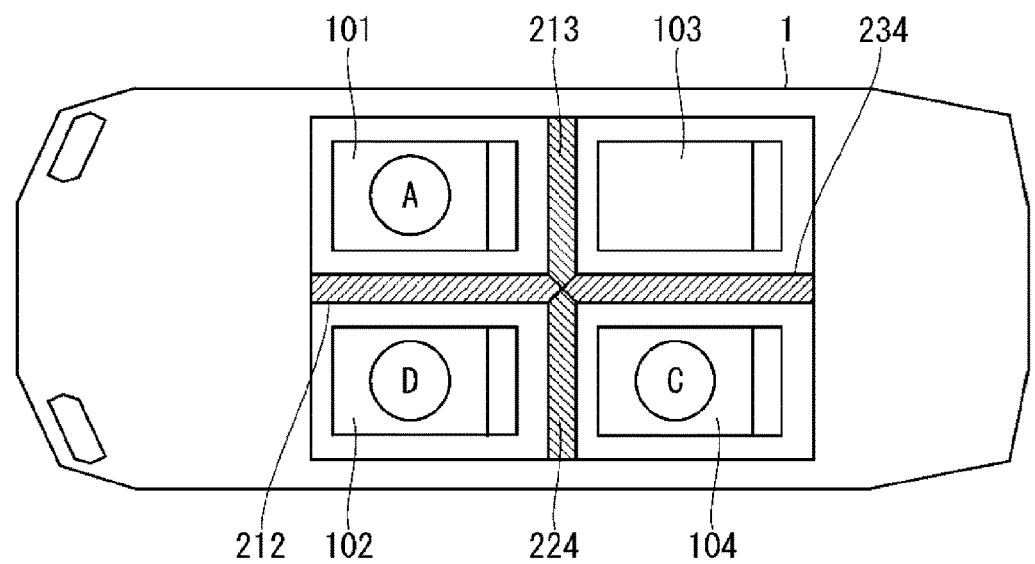
FIG. 33 is a diagram illustrating layout decision processing.
Figure 34:
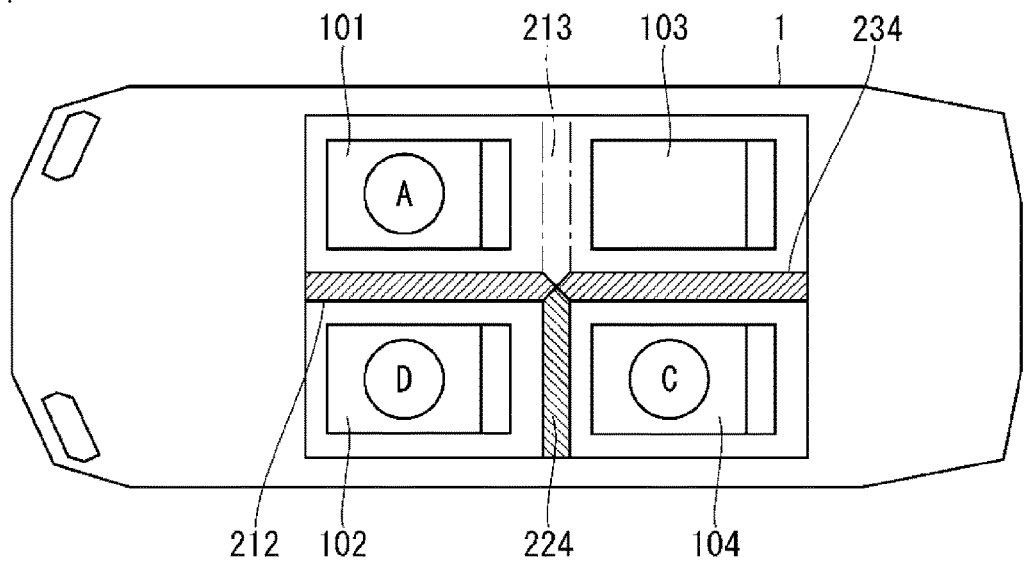
FIG. 34 is a diagram illustrating layout decision processing.

FIGS. 33 and 34 illustrate layout decision processing that is performed when the vehicle 1 transitions from the state shown in FIG. 18 to the state shown in FIG. 19. The diagrams shown in FIGS. 33 and 34 show the progression of this processing in the stated order.

Figure 35:
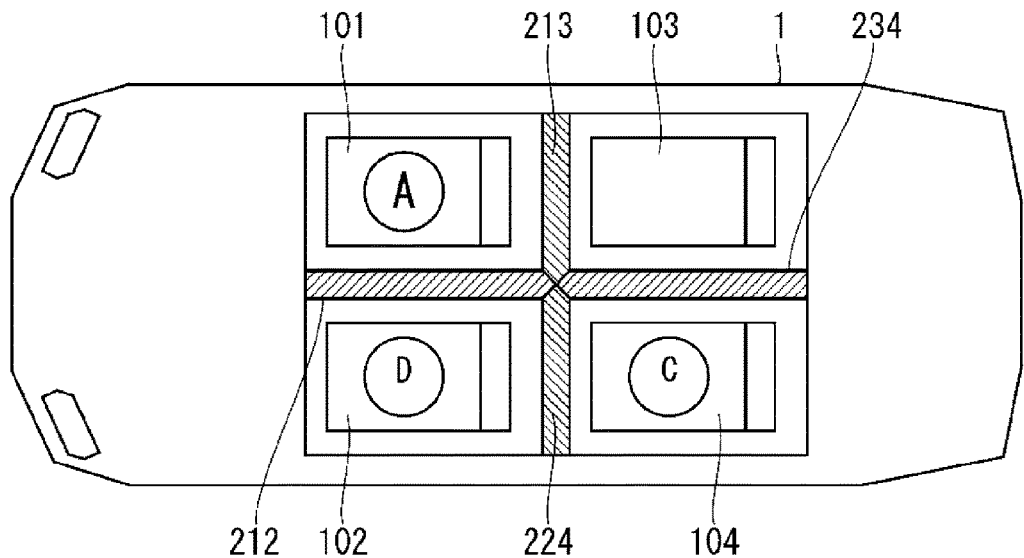
FIG. 35 is a diagram illustrating layout decision processing.
Figure 36:
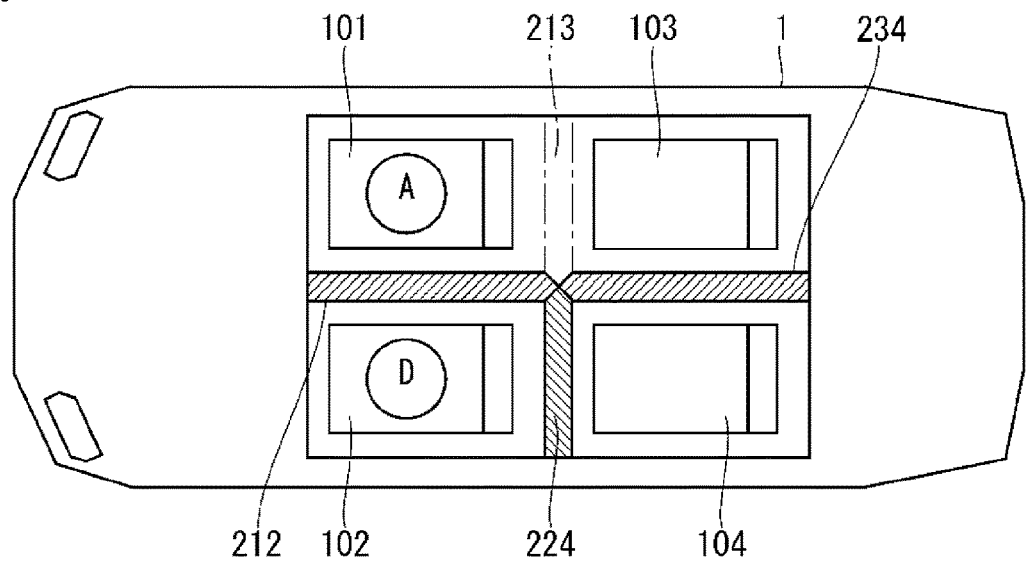
FIG. 36 is a diagram illustrating layout decision processing.
Figure 37:
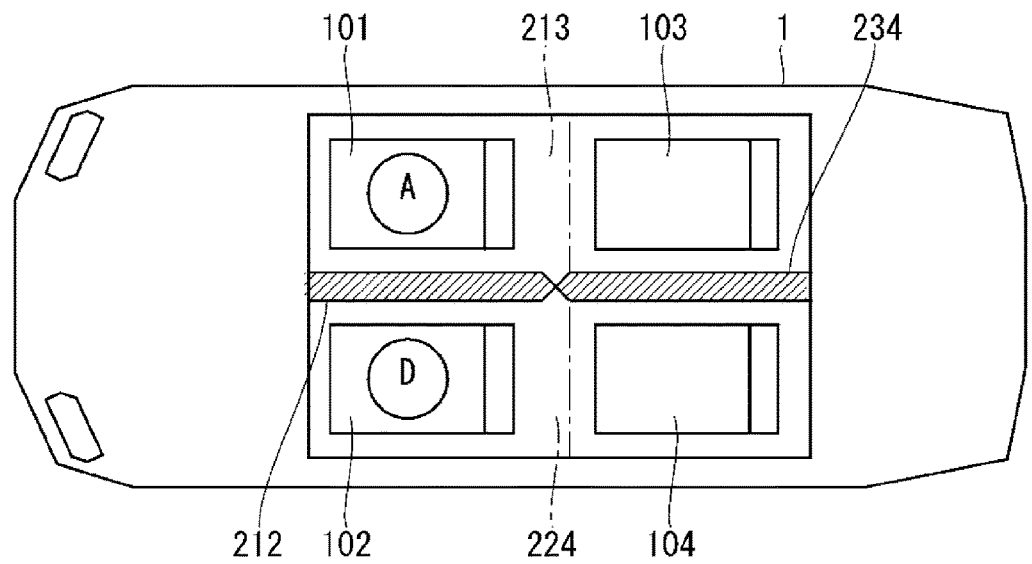
FIG. 37 is a diagram illustrating layout decision processing.
Figure 38:
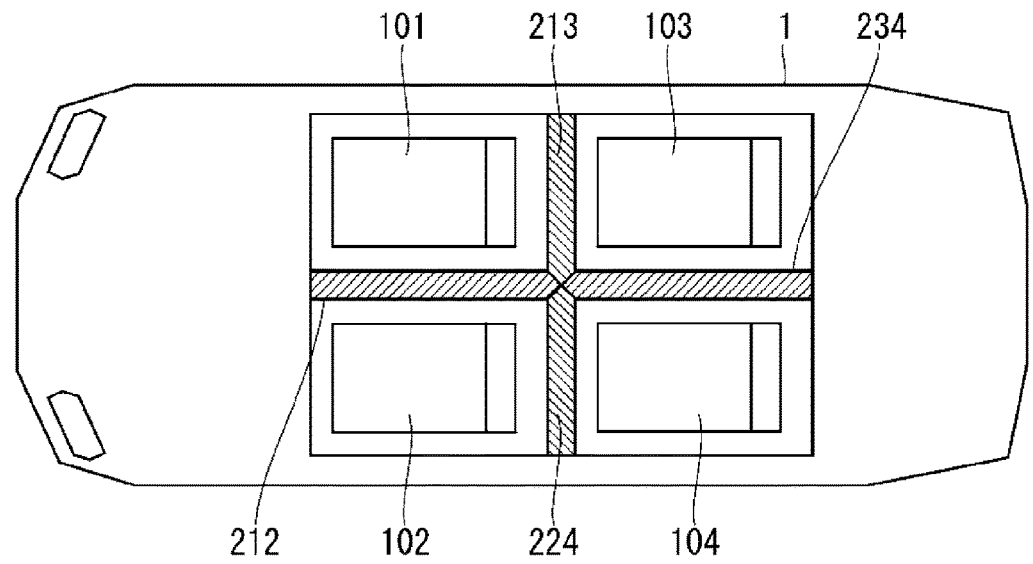
FIG. 38 is a diagram illustrating layout decision processing.
Figure 39:
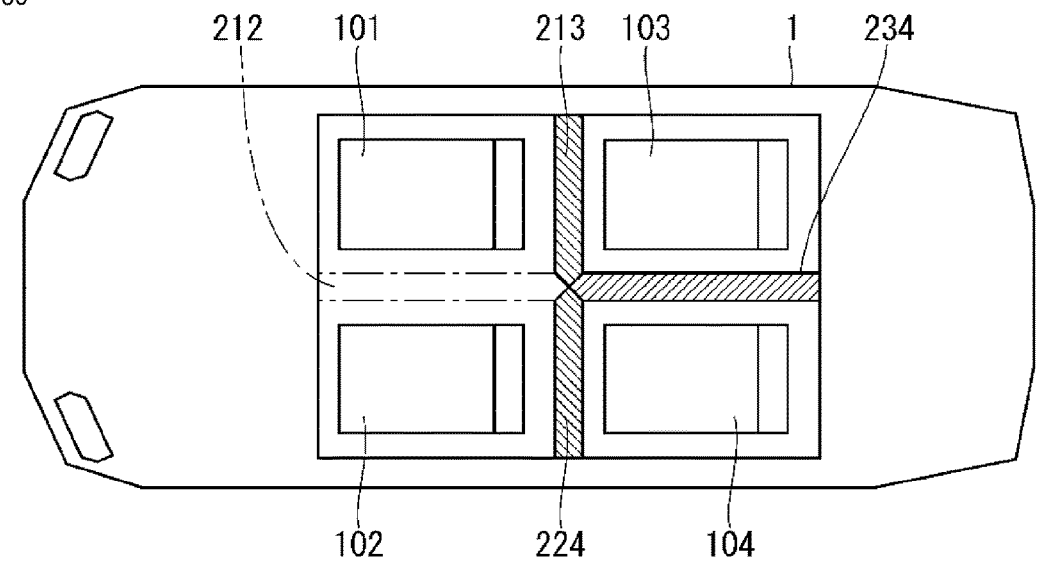
FIG. 39 is a diagram illustrating layout decision processing.
Figure 40:
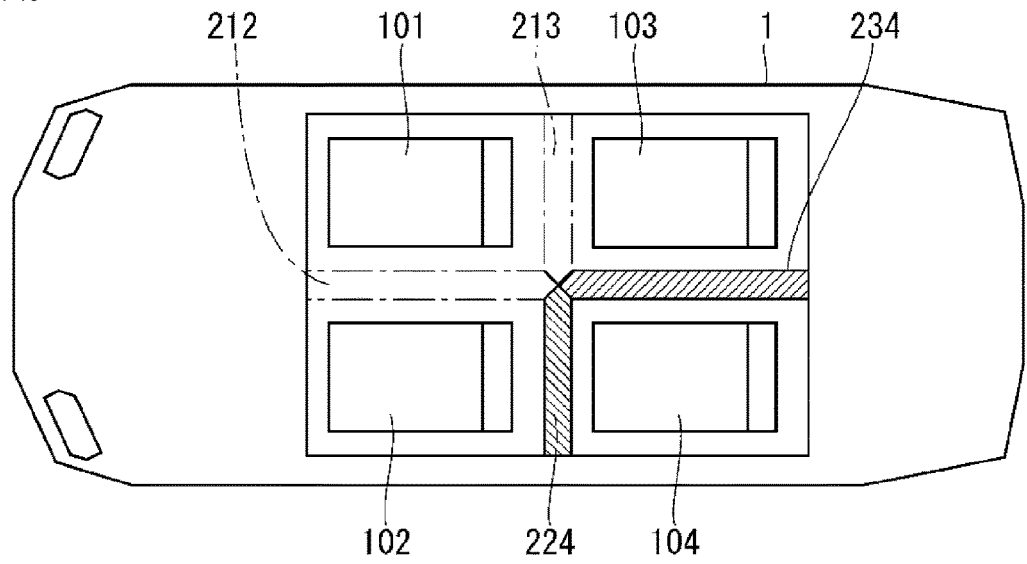
FIG. 40 is a diagram illustrating layout decision processing.
Figure 41:
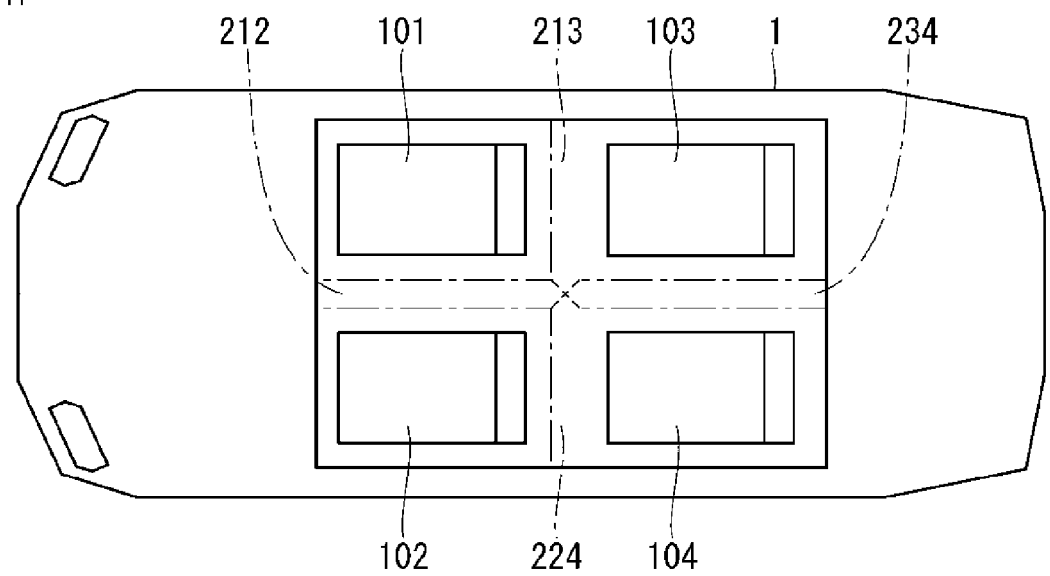
FIG. 41 is a diagram illustrating layout decision processing.

FIGS. 35 to 37 illustrate layout decision processing that is performed when the vehicle 1 transitions from the state shown in FIG. 20 to the state shown in FIG. 21. The diagrams shown in FIGS. 35, 36 and 37 show the progression of this processing in the stated order.

FIGS. 38 to 41 illustrate layout decision processing that is performed when the vehicle 1 transitions from the state shown in FIG. 21 to the state shown in FIG. 22. The diagrams shown in FIGS. 38, 39, 40 and 41 show the progression of this processing in the stated order.

Progression of the processing shown in FIGS. 23 to 41 is, however, performed as virtual opening and closing of partitions, and actual opening and closing of partitions will be described later.

Figure 42:
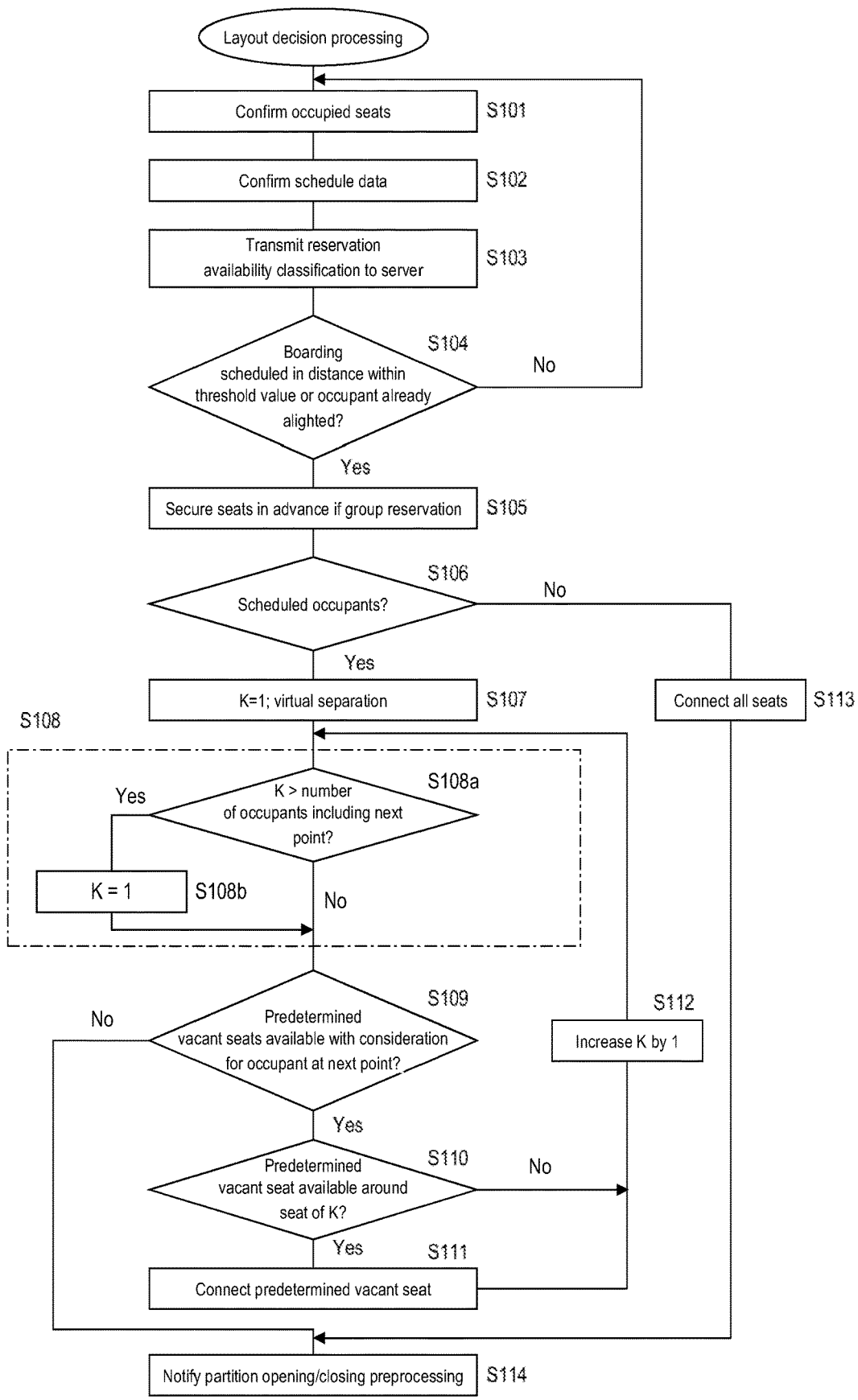
FIG. 42 is a flowchart showing layout decision processing.

FIG. 42 is a flowchart showing the layout decision processing. The layout decision processing is executed by the partition opening/closing determination unit 91, unless stated otherwise.

Step S101 is executed at the beginning of the layout decision processing. In step S101, occupied seats are confirmed. Seats that are occupied are confirmed from the pressure sensor information J5. Specifically, seating is determined from the pressure that is applied to the seat surfaces of the seats 101, 102, 103 and 104.

After execution of step S101, step S102 is executed. In step S102, reservation data is confirmed. Reservation data is data indicating at least one of scheduled boarding and scheduled alighting by occupants, and is included in the information J4, for example.

After execution of step S102, step S103 is executed. In step S103, a reservation availability classification is transmitted to a server. The server is provided in the communication facility X, or is connected in a manner that enables exchange of information with the communication facility X. The server receives desires to board and alight from occupants, arbitrates the desires, and generates reservation data. Because such reception of desires and generation of reservation data are known technologies, a detailed description thereof will be omitted.

The reservation availability classification refers to information for classifying whether boarding of the vehicle 1 in which the partition opening/closing determination unit 91 is installed is possible. In the present embodiment, classification of the availability of group reservation is also included in the reservation availability classification.

Here, "group reservation" refers to a reservation in which a plurality of occupants are allocated to adjacent seats with the partition open. "Adjacent seats" in this case does not include seats that are only diagonally arranged. For example, the seats 101 and 104 are not adjacent seats, and the seats 102 and 103 are not adjacent seats. Seats that are arranged in an L shape such as the seats 101, 102 and 104 or the seats 101, 102 and 103 are included as adjacent seats.

Figure 43:
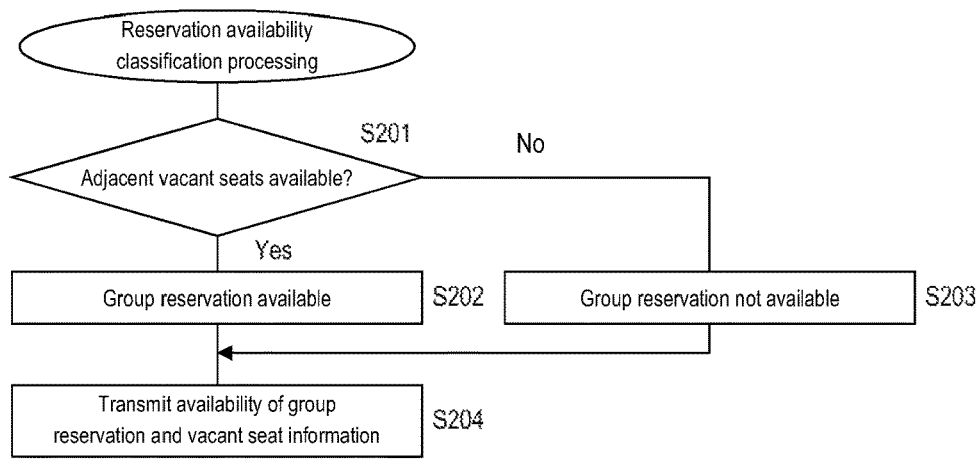
FIG. 43 is a flowchart showing reservation availability classification processing.

FIG. 43 is a flowchart showing processing for the reservation availability classification to be obtained (hereinafter, provisionally referred to as "reservation availability classification processing"). Step S201 is executed at the beginning of the reservation availability classification processing. In step S201, it is judged whether there are adjacent vacant seats from the result of step S101. If there are adjacent vacant seats, a plurality of occupants will be able to sit in a plurality of seats with the partition open.

Therefore, if the judgment of step S201 is affirmative, step S202 is executed, and it is decided that group reservation is possible (shown as "group reservation available" in diagram). If the judgment of step S201 is negative, step S203 is executed, and it is decided that group reservation is not possible (shown as "group reservation not available" in diagram).

In FIG. 43, the flowchart is shown in a simplified manner in order to avoid complicating the diagram, but three or more occupants cannot be allocated to adjacent seats with the partition open if the number of the adjacent vacant seats is two. Therefore, to give a more detailed description, in the processing of steps S201, S202 and S203, it is decided that group reservation less than or equal to the number of the adjacent vacant seats is possible, and group reservation exceeding that number is not possible.

After the decision in step S202 or S203, in step S204, the availability of group reservation decided in step S202 or S203 and vacant seat information indicating seats that are vacant are targeted for transmission. The reservation availability classification is shown as being provided to the center information unit 804 as information M4 in FIG. 12. The information M4 is transmitted to the communication facility X from the center information unit 804, and the reservation availability classification is provided to the server, not shown, from the communication facility X. Step S103 is executed in this manner.

After execution of step S103, step S104 is executed. In step S104, it is judged whether an occupant is scheduled to board in a distance within a threshold value, or whether an occupant has already alighted from when the layout decision processing started.

The "distance within a threshold value" is a distance corresponding to a predetermined period, and is decided by multiplying the average speed of the vehicle 1 at the point in time at which step S103 is executed by the predetermined period. The average speed of the vehicle 1 is obtained from the vehicle information J1.

The "predetermined period" is set as the sum of the required drive time and the standby drive time. The "required drive time" is set to greater than or equal to the time period required in the drive for performing partition opening/closing, such as three times this time period, for example. The "drive standby time" is the average value of the time period from when an announcement indicating the start of partition opening/closing is given to occupants until when the partition opening/closing is performed. The required drive time and the standby drive time are both set from past actual values and stored in the partition opening/closing determination unit 91.

If there is a time margin before the drive for performing partition opening/closing starts, the current occupation area of occupants is not reduced by holding the drive for closing partitions. Also, if no occupants have alighted after the start of layout decision processing, no vacant seats will have become newly available.

Therefore, if no occupants are scheduled to board in a distance within the threshold value and no occupants have already alighted, the judgment of step S104 will be negative and step S101 is executed again.

On the other hand, if an occupant is scheduled to board in a distance within the threshold value, it may possibly be necessary to newly close a partition, or if an occupant has already alighted, it may possibly be necessary to newly open a partition. Therefore, if the judgment of step S104 is affirmative, step S105 is executed.

If there is a group reservation in step S105, seats are secured first. The case where the occupant A is sitting in the seat 101, and the seats 102, 103 and 104 are vacant seat as shown in FIG. 14, for example, will be described.

The case when the reservation data includes a group reservation for the two occupants B and C and the scheduled boarding of the occupant D is assumed. In the event that the seat 104 is allocated to the occupant D, the two occupants B and C will be allocated the seats 102 and 103, and adjacent seats cannot be allocated to the occupants B and C.

Therefore, in step S105, the seats 102 and 104 or the seats 103 and 104 are allocated to the occupants B and C in such a case.

Of course, if there is no period in which the occupants B and C are in the vehicle at the same time as the occupant D, such allocation of seating is unnecessary. Therefore, step S105 may be replaced by processing to "if there is a group reservation that overlaps with boarding period of other occupants, secure seats for occupants corresponding to the group reservation first.

Deciding seats in which occupants will sit based on location information and identification information is as illustrated above. In this way, the partition opening/closing determination unit 91 deciding the seats in which occupants will sit using the information J4 (more specifically, reservation data) is advantageous from the viewpoint of realizing partitioning that corresponds to the seating positions of occupants in the vehicle 1.

After execution of step S105, step S106 is executed. In step S106, it is judged whether there are any occupants (hereinafter, provisionally referred to as "scheduled occupants") who are scheduled to be seated in a distance within the threshold value. If the occupants A and D shown in FIG. 21 who were on board have alighted, the result of the judgment of step S104 is affirmative. Also, if no new occupants are scheduled to board after the occupants A and D have alighted, the judgment of step S106 will be negative and step S113 is executed.

In step S113, all of the seats, that is, all of the seats 101, 102, 103 and 104, are connected. Here, the seats being "connected" refers to partitions that were closed in a virtual manner (regardless of whether the partitions are actually closed) between the seats being opened in a virtual manner.

This processing is illustrated in FIGS. 38 to 41. All of the partitions 212, 213, 224 and 234 are initially closed in a virtual manner. The partitions 212 and 213 are then opened in a virtual manner in the stated order, and further the partitions 224 and 234 are opened in a virtual manner.

After execution of step S113, in step S114, notification of partition opening/closing preprocessing is performed. "Partition opening/closing preprocessing" is processing that precedes the drive for actually opening/closing partitions, as will be described later. Also, this notification will be referred to later as a "partition change request".

If the judgment in step S106 is affirmative, step S107 is executed. In step S107, a number K of the boarding order is initialized (K=1). The number K of the boarding order indicates the order in which occupants boarded, and is allocated to seats through the occupant boarding preprocessing and occupant alightment postprocessing that will be described later.

In the processing of steps S107, S108, S109, S110 and S111, partitions to be actually opened/closed are decided, based on the state in which partitions are opened/closed in a virtual manner. A state in which all of the partitions 212, 213, 224 and 234 are initially closed is assumed as the initial state of this virtual opening/closing in step S107. In FIG. 42, setting of this virtual initial state is referred to as "virtual separation". This is because all of the seats are divided by partitions in a virtual manner.

After step S107, step S109 is executed via execution of step S108. In the vehicle 1 illustrated in FIGS. 13 to 22, the total number of seats is four, in which case step S108 does not have substantial significance and may be omitted.

Because step S108 has substantial significance in the case where the total number of seats is five or more, such as in the case where the total number of seats is six, for example, step S108 will be described later.

In step S109, it is judged whether any predetermined vacant seats are available with consideration for occupant at the next point. The "next point" corresponds to at least one of the nearest point in time at which an occupant is scheduled to board and the nearest point in time at which an occupant is scheduled to alight, or to at least one of the nearest location at which an occupant is scheduled to board and the nearest location at which an occupant is scheduled to alight. If an affirmative judgment is obtained in step S104 but there are no occupants who have already alighted, the location corresponding to the next point is a distance within the threshold value from the vehicle 1 currently. "Predetermined vacant seat" refers to a vacant seat that is not connected to an occupied seat. Note that the existence of this connection is judged from the virtual open/closed state of partitions.

Description will be given taking the state after the occupant B has alighted from the state shown in FIG. 17 and the vehicle 1 has transitioned to the state shown in FIG. 18 as an example. In the state shown in FIG. 18, the occupants A, C and D respectively correspond to numbers 1, 2 and 3 in the boarding order, according to the boarding order shown in FIGS. 13 to 17.

The judgment of step S104 will be affirmative due to the occupant B having alighted, the judgment of step S106 will be affirmative due to the occupants A, C and D being on board, and, in step S107, the number K of the boarding order is initialized to 1 and virtual separation is also performed.

As shown in FIGS. 18 to 22, there is no new boarding after the occupant B has alighted. Therefore, given that there is no occupant of the next point in step S109, the seat 103 in which the occupant B was sitting is available as a predetermined vacant seat. Therefore, the judgment result of step S109 is affirmative, and step S110 is executed.

In step S110, it is judged whether a predetermined vacant seat is available around the seat in which the occupant corresponding to the number K of the boarding order is sitting (referred to as the "seat of K" in the diagram in order to avoiding complicating the notation). Here, "around" includes not only front-back and left-right but also diagonally arranged seats.

In the state shown in FIG. 18, only the seat 103 rearward of the seat 101 in which the occupant A corresponding to number 1 in the boarding order is sitting is available as a predetermined vacant seat. Therefore, the judgment of step S110 is affirmative and step S111 is executed.

In step S111, the predetermined vacant seat serving as the basis for the judgment in step S110 being affirmative is connected to the "seat of K". This processing is illustrated in FIGS. 33 and 34, and the partition 213 is open in a virtual manner.

After execution of step S111, in step S112, the number K of the boarding order increases by 1. Step S109 is then executed again via step S108. Despite being a vacant seat, the seat 103 is already connected to the occupied seat 101, and thus does not corresponding to "a predetermined vacant seat", and the processing advances to step S114. In step S114, notification for deciding partitions to be opened/closed is executed. The content of this notification is a request to open the partition 213 in the above-described example or further a request to close the partitions 212, 224 and 234.

In this way, if an affirmative judgment result is obtained in step S109, step S112 is repeatedly executed, and step S110 is judged for different occupants. If a predetermined vacant seat is available, that seat is targeted for connection, and the vacant seat ceases to be "a predetermined vacant seat" due to execution of step S111. Therefore, steps S112 and S110 or steps S112 and S111 are repeatedly executed until the judgment result of step S109 becomes negative. When a negative judgment result is obtained in step S109, step S114 is executed.

Description will be given taking the state after the occupant C has alighted from the state shown in FIG. 19 and the vehicle 1 has transitioned to the state shown in FIG. 20 as an example. In the state shown in FIG. 20, the occupants A and D respectively correspond to numbers 1 and 2 in the boarding order, according to the boarding order shown in FIGS. 13 to 17.

The judgment of step S104 will be affirmative due to the occupant C having alighted, the judgment of S106 will be affirmative due to the occupants A and D being on board, and, in step S107, the number K of the boarding order is initialized to 1 and virtual separation is also performed.

Because the seats 103 and 104 correspond as predetermined vacant seats in step S109 (FIG. 35), step S110 is executed. Because the seat 103 is located rearward of the seat 101 in which the occupant A corresponding to number 1 in the boarding order is sitting, the judgment result of step S110 will be affirmative, and the seat 103 serving as the basis for this judgment result is connected to the seat 101 (see FIG. 36).

Because the seat 104 is still available as a predetermined vacant seat, step S110 is executed via steps S112 and S109. Because the seat 104 is located rearward of the seat 102 in which the occupant D corresponding to number 2 in the boarding order is sitting, the judgment result of step S110 is affirmative, and the seat 104 serving as the basis for this judgment result is connected to the seat 102 (see FIG. 37).

Subsequently, the judgment result of step S109 that is executed via step S112 will be negative (see FIG. 37; seats 103 and 104 are respectively connected to seats 101 and 102, and thus do not correspond to predetermined vacant seats), and step S114 is executed. In this case, the content that is notified in step S114 is a request to open the partitions 213 and 224 or further a request to close the partitions 212 and 234.

Description will be given taking the period before the occupant A boards from the state shown in FIG. 13 and the vehicle 1 transitions to the state shown in FIG. 14 as an example. Due to the location where the occupant A is scheduled to board being a distance within the threshold value from the current position of the vehicle 1, the judgment result of step S104 will be affirmative. The judgment result of step S106 will be affirmative because the occupant A is a scheduled occupant, and, in step S107, the number K of the boarding order is initialized to 1 and virtual separation is also performed.

Figure 24:
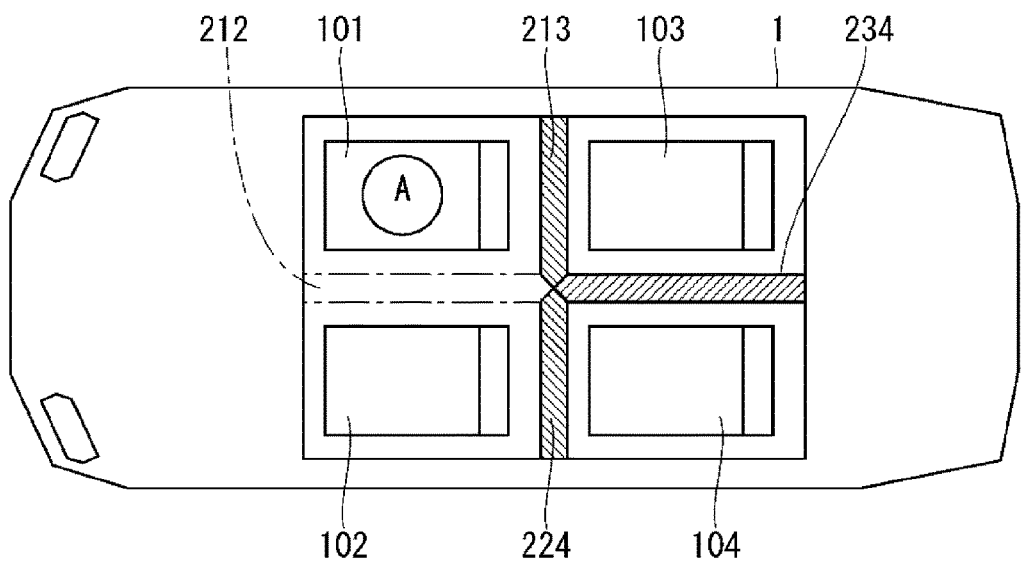
FIG. 24 is a diagram illustrating layout decision processing.
Figure 25:
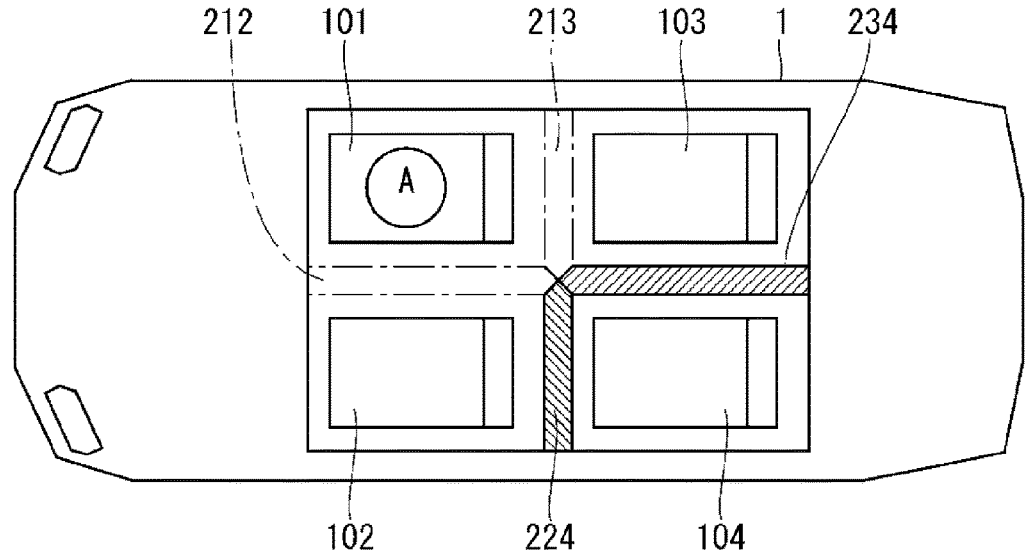
FIG. 25 is a diagram illustrating layout decision processing.
Figure 26:
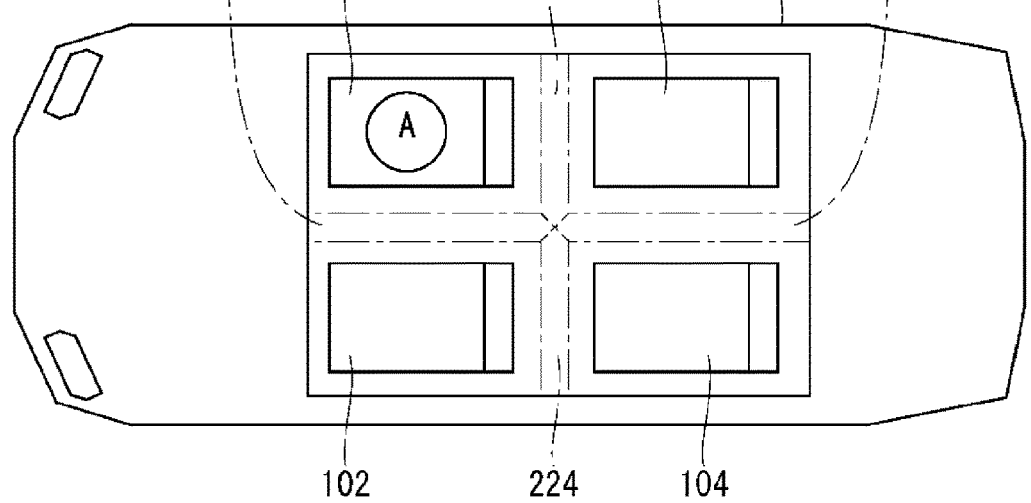
FIG. 26 is a diagram illustrating layout decision processing.

The occupant A is the first to board the vehicle 1, and thus corresponds to number 1 in the boarding order. Here, the case where the occupant A sits in the seat 101 will be illustrated (see FIG. 23). Because the seats 102, 103 and 104 are available as predetermined vacant seats for the seat 101, the judgment results of steps S109 and S110 are both affirmative, and step S111 is executed. The state in which the seat 102 is connected to the seat 101 is shown in FIG. 24, the state in which the seat 103 is connected to the seat 101 is shown in FIG. 25, and the state in which the seat 104 is connected to the seat 101 is shown in FIG. 26.

Because the seats 102, 103 and 104 are connected to the seat 101, the judgment result of step S109 that is executed via step S112 will be negative, and step S114 is executed. In this case, the content that is notified in step S114 is a request to open the partitions 212, 213, 224 and 234.

Description will be given taking the period before the occupant B boards from the state shown in FIG. 14 and the vehicle 1 transitions to the state shown in FIG. 15 as an example. Until the location where the occupant B is scheduled to board approaches to a distance within the threshold value from the current position of the vehicle 1, the judgment result of step S104 will be negative.

Therefore, if a second occupant (here, occupant B) is not scheduled to sit in a second seat (here, seat 102 or 103) adjacent to a first seat (here, seat 101) in which a first occupant (here, occupant A) is sitting within a predetermined period, the partition (here, partition 212 or 213) between the first seat and the second seat is not closed. Therefore, the occupation area of the occupant A will be larger than the seat 101, and the comfort of sitting time improves.

If the judgment result of step S104 later becomes affirmative, the judgment result of step S106 will be affirmative because the occupants A and B are scheduled occupants, and, in step S107, the number K of the boarding order is initialized to 1 and virtual separation is also performed. The case where the occupants A and B are respectively sitting in the seats 101 and 103 is illustrated (see FIG. 27).

The occupants A and B correspond respectively to numbers 1 and 2 in the boarding order. The seat 102 is connected to the seat 101 due to steps S109, S110 and S111 that are executed when the number K of the boarding order is 1 (see FIG. 28). The seat 104 is connected to the seat 103 due to steps S109, S110 and S111 that are executed when the number K of the boarding order is 2 (see FIG. 29). As a result of the processing thus far, there are no longer any seats corresponding to predetermined vacant seats.

The judgment result of step S109 that is executed when the number K of the boarding order is 3 will be negative, and step S114 is executed. In this case, the content that is notified in step S114 is a request to close the partitions 213 and 224, or further a request to open the partitions 212 and 234.

Description will be given taking the period before the occupant C boards from the state shown in FIG. 15 as an example. Until the location where the occupant C is scheduled to board approaches to a distance within the threshold value from the current position of the vehicle 1, the judgment result of step S104 will be negative.

Therefore, if a second occupant (here, occupant C) is not scheduled to sit in a second seat (here, seat 104) adjacent to a first seat (here, seat 103) in which a first occupant (here, occupant B) is sitting within the predetermined period, the partition (here, partition 234) between the first seat and the second seat is not closed. Therefore, the occupation area of the occupant B will be larger than the seat 103, and the comfort of sitting time improves.

If the judgment result of step S104 later becomes affirmative, the judgment result of step S106 will be affirmative because the occupants A, B and C are scheduled occupants, and, in step S107, the number K of the boarding order is initialized to 1 and virtual separation is also performed. The case where the occupants A, B and C are respectively sitting in the seats 101, 103 and 104 is illustrated (see FIG. 30).

The occupant A corresponds to number 1 in the boarding order, and the seat 102 is connected to the seat 101 due to steps S109, S110 and S111 that are executed when the number K of the boarding order is 1 (see FIG. 31). The judgment result of step S109 that is executed when the number K of the boarding order is 2 will be negative, and step S114 is executed.

In this case, the content that is notified in step S114 is a request to open the partition 212 or further a request to close the partitions 213, 224 and 234. The state shown in FIG. 16 is thus obtained.

Description will be given taking the period before the occupant D boards from the state shown in FIG. 16 and the vehicle 1 transitions to the state shown in FIG. 17 as an example. Until the location where the occupant D is scheduled to board approaches to a distance within the threshold value from the current position of the vehicle 1, the judgment result of step S104 will be negative.

Therefore, if a second occupant (here, occupant D) is not scheduled to sit in a second seat (here, seat 102) adjacent to a first seat (here, seat 101) in which a first occupant (here, occupant A) is sitting within the predetermined period, the partition (here, partition 112) between the first seat and the second seat is not closed. Therefore, the occupation area of the occupant A will be larger than the seat 101, and the comfort of sitting time improves.

If the judgment result of step S104 later becomes affirmative, the judgment result of step S106 will be affirmative because the occupants A, B, C and D are scheduled occupants, and, in step S107, the number K of the boarding order is initialized to 1 and virtual separation is also performed (see FIG. 32). Because there are no predetermined vacant seats, the judgment of step S109 will be negative and step S114 is executed.

In this case, the content that is notified in step S114 is a request to close the partition 212 or further a request to close the partitions 213, 224 and 234.

Illustrative Example of Processing Before Opening/Closing Partitions

Figure 44:
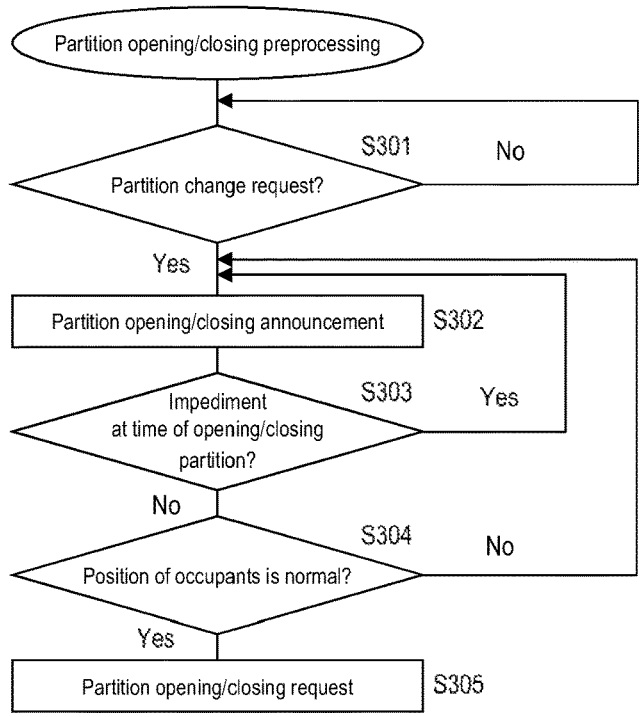
FIG. 44 is a flowchart showing partition opening/closing preprocessing.

FIG. 44 is a flowchart showing partition opening/closing preprocessing. Partition opening/closing preprocessing is processing that is performed before the partition drive unit 92 drives opening/closing of partitions, after the open/closed state of partitions is decided by the layout decision processing, and is executed by the partition opening/closing determination unit 91.

Step S301 is executed at the beginning of the partition opening/closing preprocessing. Whether there is a partition change request is judged in step S301. The partition change request is a request to change opening/closing of partitions decided by the layout decision processing. For example, the partition change request corresponds to the notification in step S114 of the flowchart shown in FIG. 42.

If the judgment result of step S301 is negative, step S301 is repeated until this judgment result becomes affirmative. If the judgment result of step S301 is affirmative, specifically, if step S114 is executed, for example, step S302 is executed.

In step S302, a partition opening/closing announcement is given. The partition opening/closing announcement is a report for making occupants aware that partitioning will be starting, for example. Because such an announcement in the vehicle 1 is easily realized by repurposing a known technology, such as a technology for prompting seatbelt wearing, for example, a detailed description thereof will be omitted. Step S302 is processing that is executed by the partition opening/closing determination unit 91, and, more precisely, is thus control for causing the partition opening/closing announcement to be given.

After step S302 has been executed, step S303 is executed. In step S303, it is judged whether there is an object that will be an impediment when the partition is opened/closed (shown as "impediment at time of opening/closing partition" in diagram). Such a judgement is realized by a known technology that uses the pressure sensor information J5 (more specifically, information on pressure applied to partitions 212, 213, 224 and 234).

If there is an impediment (if the judgment result of step S303 is affirmative), step S302 is executed again. Due to execution of steps S302 and S303, it is expected that the impediment will be removed by an occupant.

If the judgment result of step S303 is negative, step S304 is executed. In step S304, it is judged whether the position of occupants is normal, such as whether the seated state is normal, for example. The judgment of step S304 itself is realized by a known technology that uses the pressure sensor information J5 (more specifically, information on pressure applied to the seat surfaces of seats 101, 102, 103 and 104).

For example, in a state in which the partitions 213 and 224 are closed and the partitions 212 and 234 are open as shown in FIG. 15, the occupant B could possibly be sitting so as to straddle the seats 103 and 104. In such a situation, the occupant B will be an impediment when closing the partition 234. Therefore, in such a situation, the judgment result of step S304 will be negative, and step S302 is executed again.

If the judgment result of step S304 is affirmative, step S305 is executed. In step S305, a partition opening/closing request is issued. The partition opening/closing request is a notification for requesting driving for the partition opening/closing. The partition opening/closing request and the partition change request (notification from step S114 obtained in layout decision processing) are illustrated in FIG. 12 as a request D1 to the partition drive unit 92.

Due to execution of steps S302, S303 and S304, partitions are opened/closed in a state where any impediments have been removed.

Illustrative Example of Processing for Driving Opening/Closing of Partitions

Figure 45:
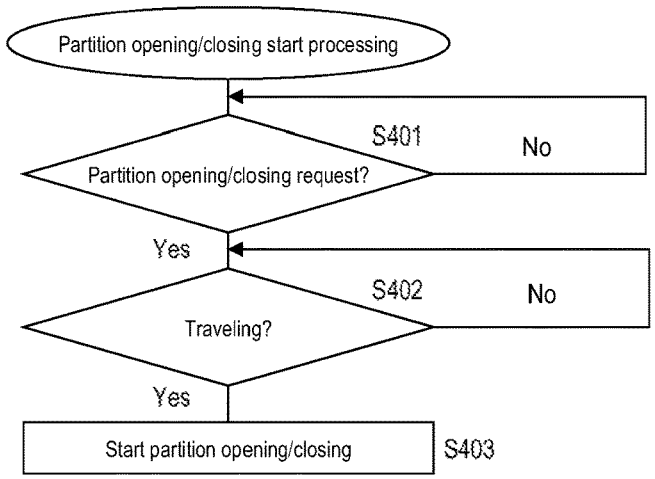
FIG. 45 is a flowchart showing partition opening/closing start processing.

FIG. 45 is a flowchart showing partition opening/closing start processing. The partition opening/closing start processing is processing in which the partition drive unit 92 starts driving opening/closing of a partition, after a partition opening/closing request is generated by the partition opening/closing preprocessing.

Step S401 is executed at the beginning of the partition opening/closing start processing. In step S401, it is judged whether there is a partition opening/closing request. If the judgment result of step S401 is negative, step S401 is repeated until this judgment result becomes affirmative. If the judgment result of step S401 is affirmative, specifically, if step S305 is executed, for example, step S402 is executed.

In step S402, it is judged whether the vehicle 1 is traveling. Opening/closing of partitions being started at least before an occupant newly boards and/or before an occupant alight is advantageous from at least the viewpoint of occupants being able to board smoothly and/or the viewpoint of occupants being able to alight smoothly. Therefore, if the judgment result of step S402 is negative, step S402 is repeated, and if the judgment result of step S402 is affirmative, opening/closing of the partition is started in step S403.

Figure 46:
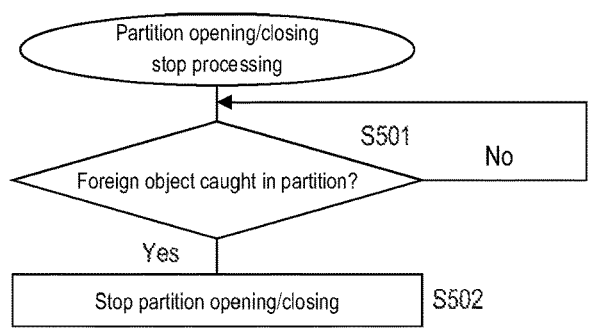
FIG. 46 is a flowchart showing partition opening/closing stop processing.

FIG. 46 is a flowchart showing partition opening/closing stop processing. The partition opening/closing stop processing functions as interrupt processing with respect to a state in which opening/closing of a partition is being driven. Step S501 is executed in the partition opening/closing stop processing. In step S501, it is judged whether a foreign object is caught in the partition at the time of partition opening/closing. Such a determination is performed based on the pressure sensor information J5, for example. Step S501 is easily realized by repurposing known processing for judging whether an object is caught in operation of a power window, for example.

If the judgment result of step S501 is negative, step S501 is repeated until this judgment result becomes affirmative. If the judgment result of step S501 is affirmative, the opening/closing of the partition is stopped in step S502. Due to execution of steps S501 and S502, partition opening/closing is stopped when an object is caught.

The partition opening/closing stop processing is executed by the partition opening/closing determination unit 91, and thus step S502 is, more precisely, a notification for stopping the drive for opening/closing a partition. Such a notification is also included in the request D1 to the partition drive unit 92 and illustrated in FIG. 12.

Processing Prior to Occupant Boarding

Figure 47:
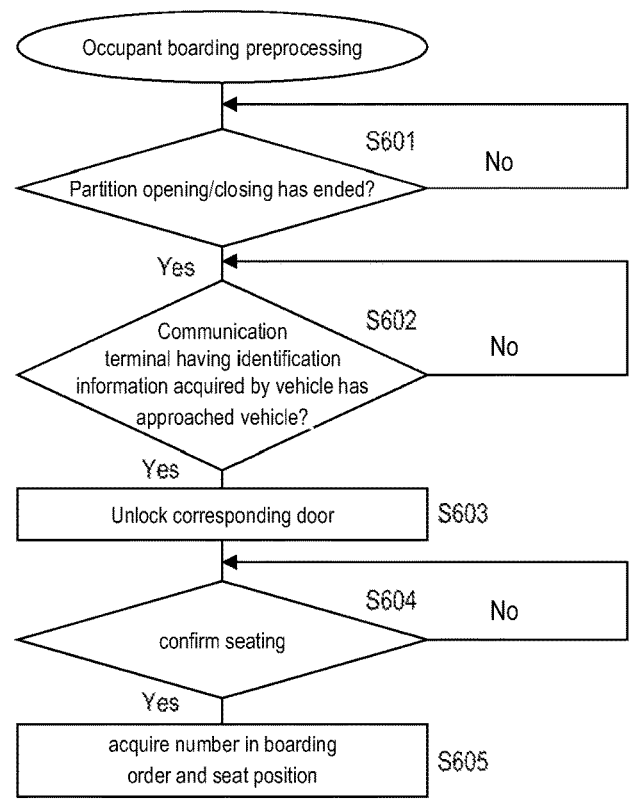
FIG. 47 is a flowchart showing occupant boarding preprocessing.

FIG. 47 is a flowchart showing occupant boarding preprocessing. The occupant boarding preprocessing is processing that is executed before an occupant newly boards, after step S403 of the partition opening/closing start processing (FIG. 45) is executed and partition opening/closing starts. The occupant boarding preprocessing is performed by the partition opening/closing determination unit 91.

Step S601 is executed at the beginning of the occupant boarding preprocessing. In step S601, it is judged whether partition opening/closing processing has ended. If the judgment result of step S601 is negative, step S601 is repeated until this judgment result becomes affirmative. If the judgment result of step S601 is affirmative, step S602 is executed.

In step S602, it is judged whether a communication terminal having identification information acquired in advance by the vehicle 1, that is, known to the vehicle 1, has approached the vehicle 1. Such a judgement is realized by a known technology.

If the judgment result of step S602 is negative, step S602 is repeated until this judgment result becomes affirmative. If the judgment result of step S602 is affirmative, step S603 is executed.

In step S603, unlocking of the door corresponding to the occupant who will newly board is performed, based on the reservation data included in the information J4. This door is a door corresponding to the occupant carrying the communication terminal serving as the basis for the judgment result of step S602 being affirmative (i.e., door associated with the seat decided for that occupant). At this time, the door may be open, as described above in the Illustrative Example of Opening/Closing of Doors section.

The occupant boarding preprocessing is executed by the partition opening/closing determination unit 91, and thus step S603 is, more precisely, control for causing the door opening/closing control unit 93 to unlock the door. Such control is illustrated in FIG. 12 as a request D2 to the door opening/closing control unit 93.

Step S403 of the partition opening/closing start processing (FIG. 45) being executed and partition opening/closing starting is premised on the vehicle 1 traveling. However, the vehicle 1 could also stop before the partition opening/closing has ended. Because step S603 is executed when the judgment results of both steps S601 and S602 are affirmative, the corresponding partitions are already in place when the occupant who is scheduled to board actually boards, and the possibility of coming face to face with other occupants is reduced.

After step S603 has been executed, step S604 is executed. In step S604, it is confirmed whether the occupant who boarded is seated. This confirmation is performed based on pressure that is applied to the seat surfaces of the seats 101, 102, 103 and 104 obtained by the pressure sensor information J5.

If the judgment result of step S604 is negative, step S604 is repeated until this judgment result becomes affirmative. If the judgment result of step S604 is affirmative, step S605 is executed.

In step S605, the number of the occupant in the boarding order (see FIG. 42 and description of FIG. 42) and the position of the seat in which the occupant is sitting are acquired. The position of the seat occupied by the occupant is specified as one of the seats 101, 102, 103 and 104.

In terms of the state of the vehicle 1 shown in FIG. 14, only the occupant A is sitting in the seat 101, and the number of the occupant A in the boarding order is 1. In terms of the state of the vehicle 1 shown in FIG. 15, the occupants A and B are respectively sitting in the seats 101 and 103, and the respective numbers in the boarding order are 1 and 2. In terms of the state of the vehicle 1 shown in FIG. 16, the occupants A, B and C are respectively sitting in the seats 101, 103 and 104, and the numbers in boarding order are 1, 2 and 3. In terms of the state of the vehicle 1 shown in FIG. 17, the occupants A, B, C and D are respectively sitting in the seats 101, 103, 104 and 102, and the numbers of each boarding order are 1, 2, 3 and 4.

Processing after Occupant Alighting

Figure 48:
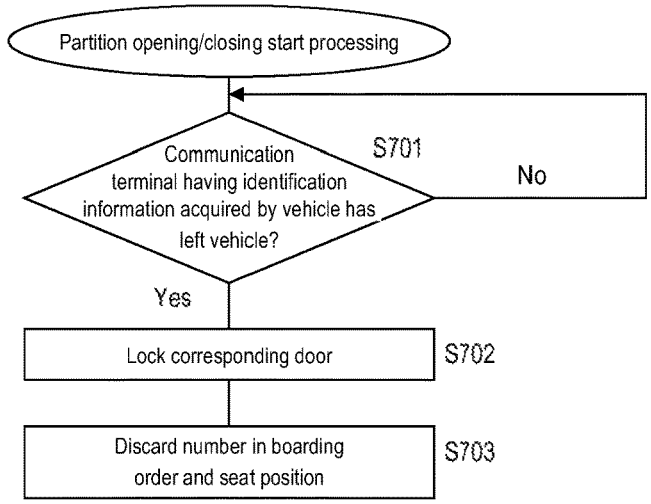
FIG. 48 is a flowchart showing occupant alightment postprocessing.

FIG. 48 is a flowchart showing occupant alightment postprocessing. The occupant alightment post-processing is processing that is executed after an occupant alight. The occupant alightment post-processing is performed by the partition opening/closing determination unit 91.

Step S701 is executed at the beginning of the occupant alightment postprocessing. In step S701, it is judged whether a communication terminal having identification information acquired in advance by the vehicle 1, that is, known to the vehicle 1, has left the vehicle 1. Such a judgment is realized by a known technology.

If the judgment result of step S701 is negative, step S701 is repeated until this judgment result becomes affirmative. If the judgment result of step S701 is affirmative, step S702 is executed.

In step S702, locking of the door corresponding to the occupant who alighted is performed, based on the reservation data included in the information J4. This door is a door corresponding to the occupant who is carrying the communication terminal serving as the basis for the judgment result of step S701 being affirmative (i.e., door associated with the seat decided for that occupant). The occupant alightment postprocessing is executed by the partition opening/closing determination unit 91, and thus step S702 is, more precisely, control for causing the door opening/closing control unit 93 to lock the door. Such control is also illustrated in FIG. 12 as the request D2 to the door opening/closing control unit 93.

In step S703, the number of the occupant in the boarding order (see FIG. 42 and description of FIG. 42) and the position of the seat in which the occupant was sitting are discarded.

In terms of the state of the vehicle 1 shown in FIG. 18, the occupants A, C and D are respectively sitting in the seats 101, 104 and 102, and the respective numbers in the boarding order are 1, 2 and 3.

In terms of the state of the vehicle 1 shown in FIG. 20, the occupants A and D are respectively sitting in the seats 101 and 102, and the respective numbers in the boarding order are 1 and 2.

Case where Total Number of Seats is Five or More

Step S108 (see FIG. 42) in the layout decision processing has substantial significance in the case where the total number of seats is five or more, as described above. Hereinafter, description will be given taking the case where the total number of seats is six as an example.

Figure 49:
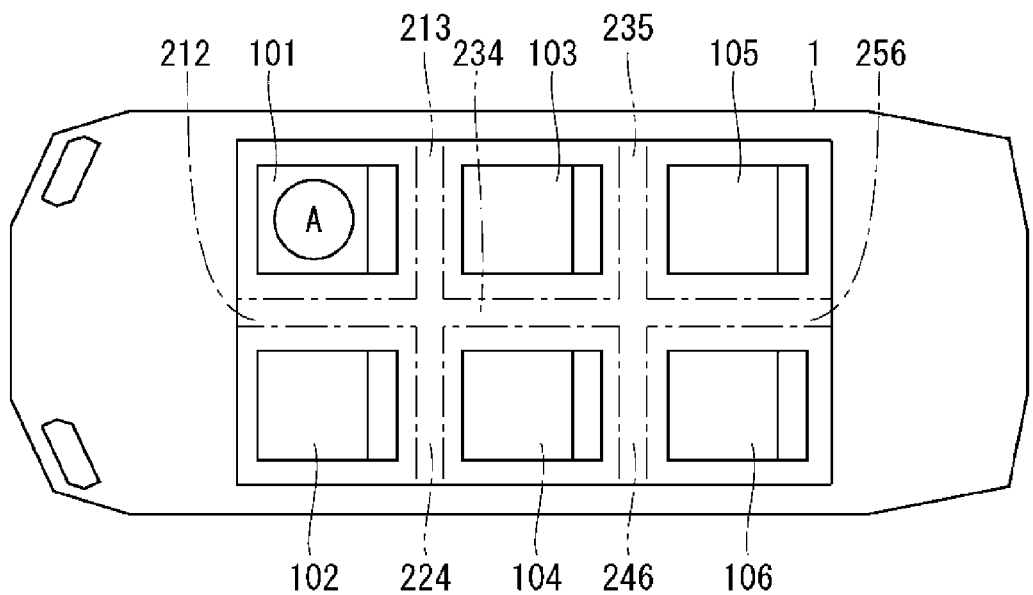
FIG. 49 is a diagram conceptually showing partitioning of a vehicle in a case where six seats are provided therein.

FIG. 49 conceptually shows partitioning of the vehicle 1 in the case where six seats are provided therein, namely, seats 101, 102, 103, 104, 105 and 106. The seat 101 is provided on the right side in the forward movement direction, and the seat 102 is provided on the left side in the forward movement direction. The seat 103 is provided rearward of the seat 101, and the seat 105 is provided rearward of the seat 103. The seat 104 is provided rearward of the seat 102 and the seat 106 is provided rearward of the seat 104.

A partition 212 is provided between the seats 101 and 102, a partition 234 is provided between the seats 103 and 104, a partition 256 is provided between the seats 105 and 106, a partition 213 is provided between the seats 101 and 103, a partition 235 is provided between the seats 103 and 105, a partition 224 is provided between the seats 102 and 104, and a partition 246 is provided between the seats 104 and 106. In FIG. 49, however, a state where the occupant A is actually sitting in the seat 101, and all of the partitions 212, 234, 256, 213, 235, 224 and 246 are open similarly to FIG. 14 is shown.

Figure 50:
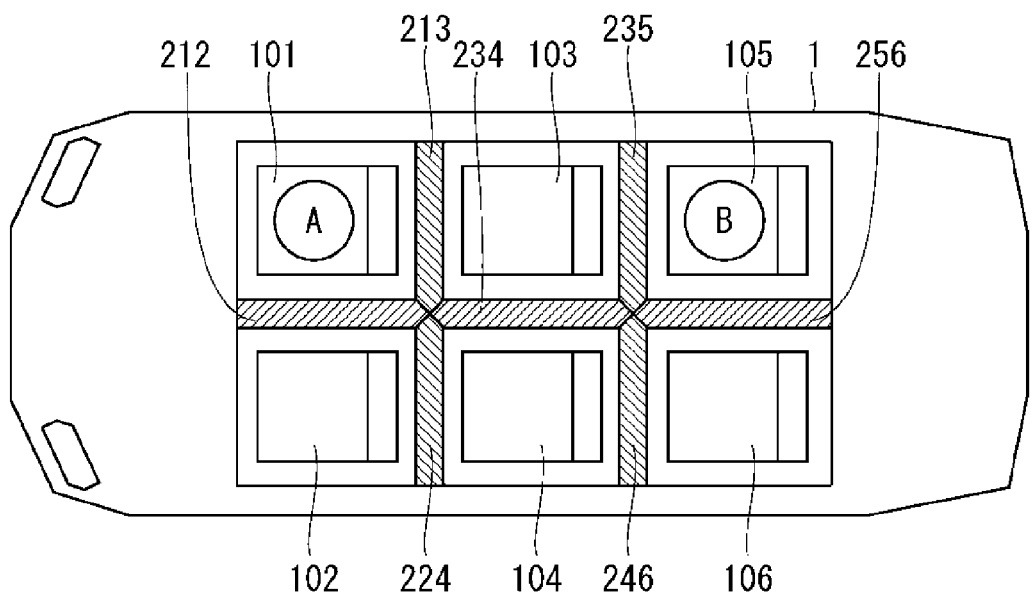
FIG. 50 is a diagram conceptually showing a state of a vehicle separated in a virtual manner.

The case where the occupant B boards at the next point and sits in the seat 105 in the vehicle 1 in such a state will be described. The judgment results of steps S104 and S106 will both be affirmative, and step S107 is executed. FIG. 50 conceptually shows the state of the vehicle 1 that has been virtually separated through execution of step S107.

After execution of step S107, step S108 is executed. In step S108, step S108a is executed first. In step S108a, it is judged whether the number K of the boarding order exceeds the number of occupants including the next point.

If the judgment result of step S108a is negative, specifically, if the number K of the boarding order is less than or equal to the number of occupants including the next point, execution of step S108 ends and step S109 is executed. If the judgment result of step S108a is affirmative, specifically, if the number K of the boarding order exceeds the number of occupants including the next point, step S108b is executed. In step S108b, the number K of the boarding order is initialized to 1.

Execution of the step S108 immediately after step S107 is executed maintains the number K of the boarding order at 1.

Figure 51:
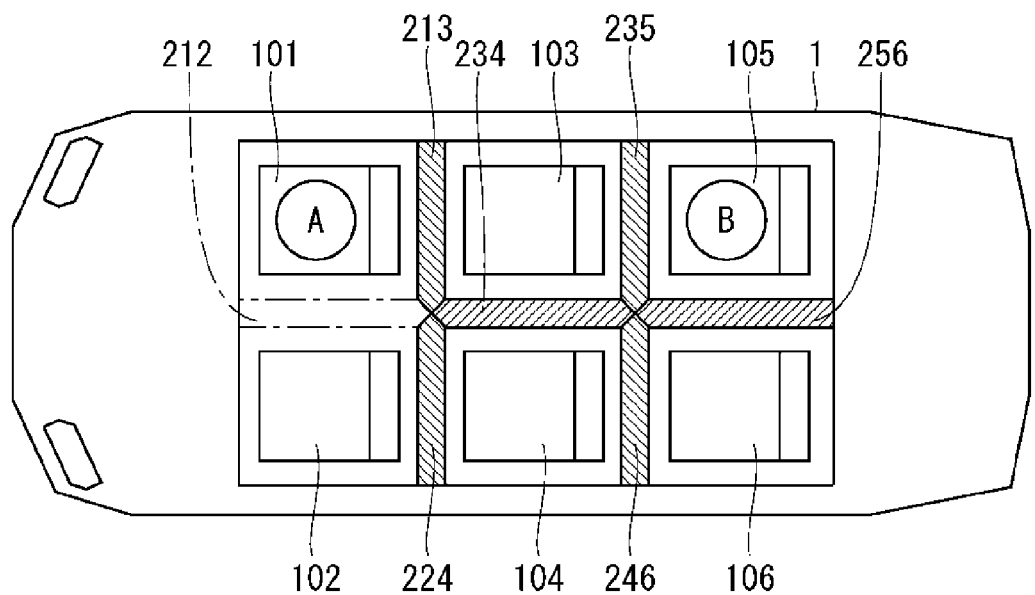
FIG. 51 is a diagram showing a virtual state of a vehicle.

The judgment results of steps S109 and S110 will both be affirmative, and step S111 is executed. The seats 102, 103 and 104 are available as predetermined vacant seats for the seat 101 in which the occupant A corresponding to number 1 in the boarding order is sitting. Here, the case where the seat 102 is connected to the seat 101 in step S111 is assumed. As a result of such a connection, the virtual state of the vehicle 1 transitions from the state shown in FIG. 50 to the state shown in FIG. 51.

Figure 52:
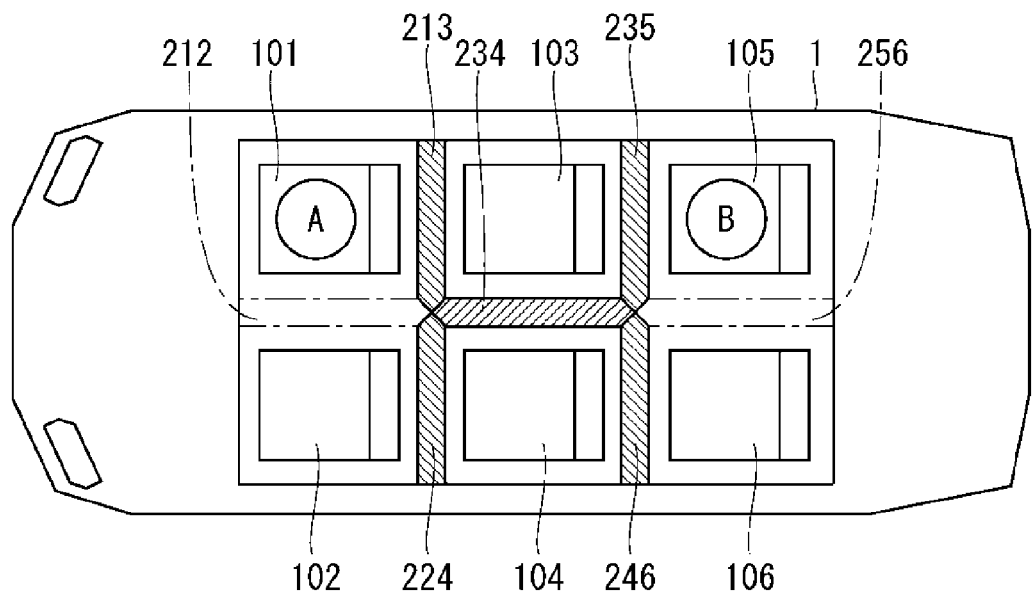
FIG. 52 is a diagram showing a virtual state of a vehicle.

After step S111 is executed, the number K of the boarding order increases from 1 to 2 due to step S112. The judgments of steps S109 and S110 will both be affirmative, and step S111 is executed. The seats 103, 104 and 106 are available as predetermined vacant seats for the seat 105 in which the occupant B corresponding to number 2 in the boarding order is sitting. Here, the case where the seat 106 is connected to the seat 105 in step S111 is assumed. As a result of such a connection, the virtual state of the vehicle 1 transitions from the state shown in FIG. 51 to the state shown in FIG. 52.

Later the number K of the boarding order increases from 2 to 3 due to execution of step S112. If step S108 is not provided, even if step S109 is executed immediately after execution of step S112, it is not necessarily the case that the judgment result of step S109 will be negative and step S114 is executed, since there is no occupant corresponding to number 3 in the boarding order. Also, even if the judgment result of step S109 is negative and step S114 is executed, the seats 103 and 104 are not connected despite being predetermined vacant seats.

By providing step S108, the number K of the boarding order is again set to 1 due to step S108*b*, after the number K of the boarding order increases from 2 to 3. Therefore, processing for newly connecting predetermined vacant seats to the seat 101 in which the occupant A corresponding to number 1 in the boarding order is sitting is performed.

Figure 53:
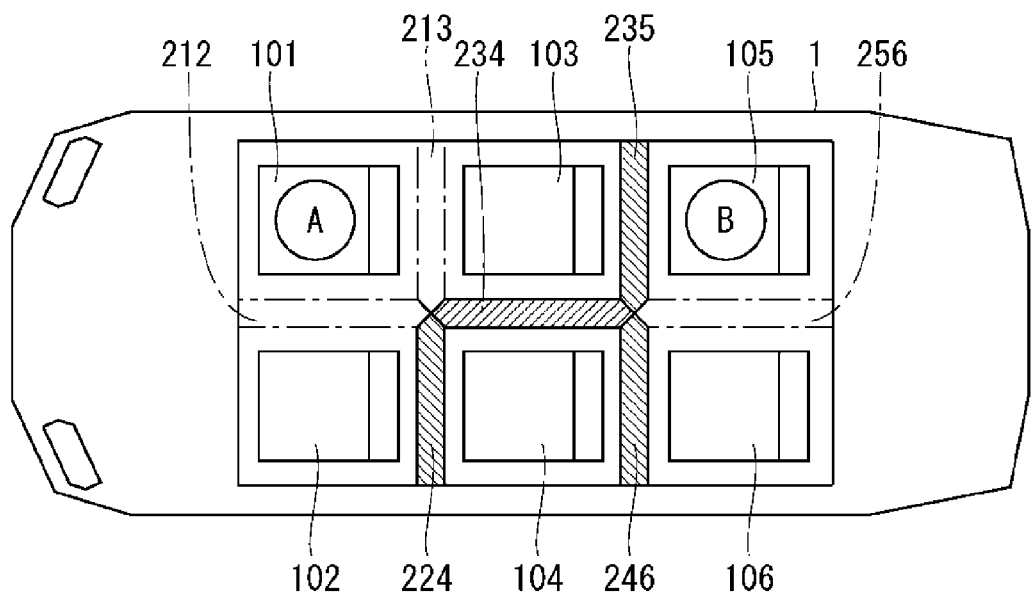
FIG. 53 is a diagram showing a virtual state of a vehicle.

When step S108*b* is initially executed, after execution of step S107, step S111 is executed via steps S109 and S110. In step S110, the seats 103 and 104 are judged to be predetermined vacant seats for the seat 101, and, in step S111, the seat 103, for example, is connected to the seat 101. As a result of such a connection, the virtual state of the vehicle 1 transitions from the state shown in FIG. 52 to the state shown in FIG. 53.

Figure 54:
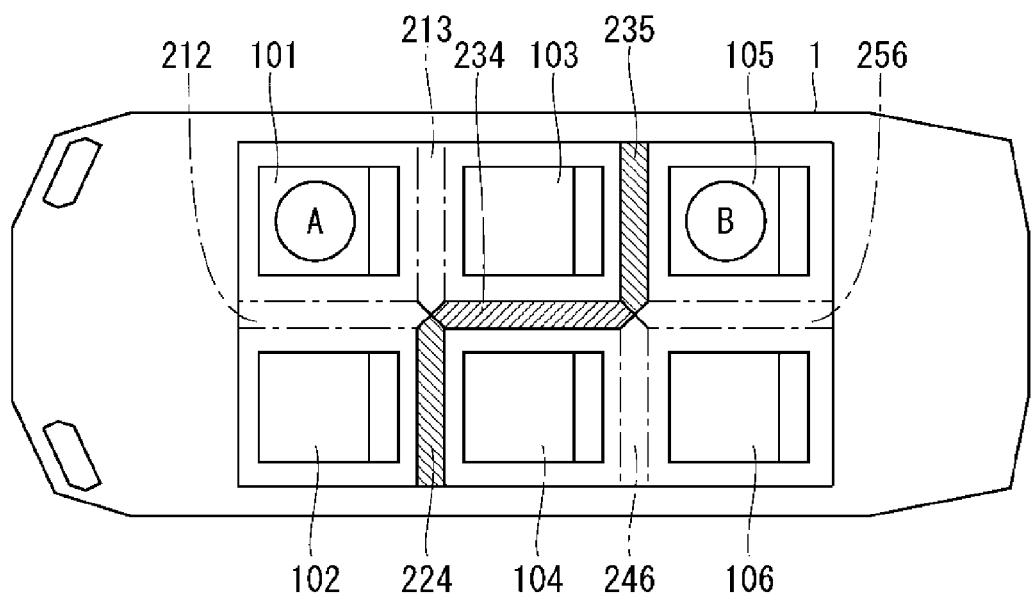
FIG. 54 is a diagram showing a virtual state of a vehicle.

Later the number K of the boarding order increases from 1 to 2 due to execution of step S112. Step S108*b* is not executed in step S108, and step S111 is executed via steps S109 and S110. In step S110, the seat 104 is judged to be a predetermined vacant seat for the seat 105, and, in step S111, the seat 104 is connected to the seat 105. As a result of such a connection, the virtual state of the vehicle 1 transitions from the state shown in FIG. 53 to the state shown in FIG. 54.

Later the number K of the boarding order increases from 2 to 3 due to execution of step S112. The number K of the boarding order is again set to 1 due to step S108*b*. The judgment result of step S109 that is executed after the setting by step S108*b* will be negative, and step S114 is executed. In this case, the content that is notified in step S114 is a request to close the partitions 224, 234 and 235, or further a request to open the partitions 212, 213, 246 and 256.

As a result of providing step S108, the occupation area of the occupant A is thus larger than the seat 101 by not only the amount of the seat 102 but also the amount of the seat 103. The occupation area of the occupant B is larger than the seat 105 by not only the amount of the seat 106 but also the amount of the seat 104. In other word, as a result of step S108 being provided, the occupation area of the occupants increases.

If the number of seats in the vehicle 1 is four, there will always be another occupant sitting around any one occupant when there are a plurality of occupants, and an event where seats are not connected despite being predetermined vacant seats does not occur. Therefore, step S108 may be omitted.

Variations

The processing of step S107 may be divided into a first stage for performing virtual separation and a second stage that is executed after the first stage. In the second stage, the number K of the boarding order is initialized. In this case, step S108*b* may be omitted, and when the judgment result of step S108*a* is affirmative, the processing may return to the second stage of step S107. This is because, in the second stage, virtual separation has already ended due to the first stage, and the second stage is equivalent to step S108*b*.

Note that the respective configurations described in the above embodiment and variations may be combined as appropriate, as long as there are no mutual inconsistencies.

The respective devices in the partition opening/closing system are provided with a computer that is constituted to include a microprocessor, a ROM (Read Only Memory) and a RAM (Random Access Memory).

A computational processing unit such as the microprocessor reads out computer programs that include some or all of the steps of the flowcharts shown in FIGS. 42 to 48 from a storage unit such as the ROM or RAM, and executes the computer programs.

These computer programs of the plurality of devices can be installed from an external server device or the like.

Also, such computer programs may be distributed in a state of being stored on a recording medium such as a CD-ROM (Compact Disc Read Only Memory), a DVD-ROM (Digital Versatile Disk Read Only Memory), and a semiconductor memory.

Although the disclosure has been described in detail above, the foregoing description is intended to be illustrative in all respects, and the disclosure is not limited to the foregoing description. It should be understood that innumerable variations that are not illustrated herein can be conceived without departing from the scope of the invention.

The invention claimed is:

1. A partition opening/closing system comprising:
   a drive device; and
   a control device,
   wherein the drive device drives opening/closing of a partition between a plurality of seats provided in a vehicle, and
   the control device determines a necessity for the opening/closing, using information indicating at least one of scheduled boarding and scheduled alighting of the vehicle by occupants.

2. The partition opening/closing system according to claim 1, wherein the control device decides the seat in which the occupants will sit, using the information.

3. The partition opening/closing system according to claim 2, wherein, if a second of the occupants is not scheduled to sit in a second of the seats adjacent to a first of the seats in which a first of the occupants sits, the partition between the first of the seats and the second of the seats is not closed.

4. The partition opening/closing system according to claim 2, wherein the opening/closing of the partition in correspondence with a situation in which the occupant who is scheduled to board the vehicle is seated ends before the occupant who is scheduled to board boards the vehicle.

5. The partition opening/closing system according to claim 3, wherein the opening/closing of the partition in correspondence with a situation in which the occupant who is scheduled to board the vehicle is seated ends before the occupant who is scheduled to board boards the vehicle.

\* \* \* \* \*